US012785765B2

(12) United States Patent
Elshafie et al.

(10) Patent No.: US 12,785,765 B2
(45) Date of Patent: Nov. 3, 2026

(54) CODEBOOK-BASED BEAMFORMING CONSIDERATIONS FOR RECONFIGURABLE SURFACES

(71) Applicant: QUALCOMM INCORPORATED, San Diego, CA (US)

(72) Inventors: Ahmed Elshafie, San Diego, CA (US); Hung Dinh Ly, San Diego, CA (US); Abdelrahman Mohamed Ahmed Mohamed Ibrahim, San Diego, CA (US); Yu Zhang, San Diego, CA (US)

( * ) Notice: Subject to any disclaimer, the term of this patent is extended or adjusted under 35 U.S.C. 154(b) by 31 days.

(21) Appl. No.: 18/714,722

(22) PCT Filed: Jan. 20, 2022

(86) PCT No.: PCT/CN2022/072928

§ 371 (c)(1),
(2) Date: May 30, 2024

(87) PCT Pub. No.: WO2023/137657

PCT Pub. Date: Jul. 27, 2023

(65) Prior Publication Data

US 2025/0023606 A1 Jan. 16, 2025

(51) Int. Cl.
*H04B 7/0456* (2017.01)

(52) U.S. Cl.
CPC .................................. *H04B 7/0456* (2013.01)

(58) Field of Classification Search
CPC ............ H01Q 1/24; H01Q 3/46; H01Q 15/14; H01Q 19/10; H01Q 21/28; H04B 7/02;
(Continued)

(56) References Cited

U.S. PATENT DOCUMENTS

2018/0115357 A1* 4/2018 Park ...................... H04W 72/00
2021/0013619 A1 1/2021 Alkhateeb et al.
(Continued)

FOREIGN PATENT DOCUMENTS

CN 110932419 A 3/2020
CN 113852402 A 12/2021
(Continued)

OTHER PUBLICATIONS

International Search Report and Written Opinion—PCT/CN2022/072928—ISA/EPO—Sep. 28, 2022.
(Continued)

*Primary Examiner* — Shawkat M Ali

(57) ABSTRACT

Methods, systems, and devices for codebook-based beamforming considerations for reconfigurable intelligent surfaces (RISs) are described. For example, an RIS may transmit, to a first wireless device, an indication of a capability of using different types of precoders for generating a codebook for the RIS for redirecting wireless signals. The codebook may include codewords associated with weights for respective elements of the RIS. In some cases, the RIS may receive, from the first wireless device, a type of precoder for generating the codebook. As such, the RIS may adjust one or more elements using the weights for the respective elements based on receiving the indication and in accordance with training a communication link between the first wireless device and a second wireless device via the plurality of elements. In some examples, the RIS may receive, from the first wireless device, an index corresponding to a codeword.

18 Claims, 19 Drawing Sheets

(58) Field of Classification Search
CPC ... H04B 7/04; H04B 7/06; H04B 7/10; H04B 7/145; H04B 7/155; H04B 7/0426; H04B 7/0456; H04B 17/336; H04L 5/00; H04L 25/02; H04W 24/02; H04W 24/10; H04W 72/04; H04W 72/044
USPC ........ 370/252, 329, 336; 375/219, 260, 262, 375/267, 295, 316
See application file for complete search history.

(56) References Cited

U.S. PATENT DOCUMENTS

2023/0208479 A1* 6/2023 Wang .................. H04B 7/0617 375/262
2023/0208486 A1* 6/2023 Dai ...................... H04B 7/0617 370/315

FOREIGN PATENT DOCUMENTS

WO WO-2021236510 A1 11/2021
WO WO-2021239259 A1 12/2021
WO WO-2021239311 A1 12/2021

OTHER PUBLICATIONS

Supplementary European Search Report—EP22921102—Search Authority—Munich—Oct. 9, 2025.

* cited by examiner

1600

CODEBOOK-BASED BEAMFORMING CONSIDERATIONS FOR RECONFIGURABLE SURFACES

CROSS REFERENCE

The present Application is a 371 national stage filing of International PCT Application No. PCT/CN2022/072928 by Elshafie et al. entitled "CODEBOOK-BASED BEAMFORMING CONSIDERATIONS FOR RECONFIGURABLE SURFACES," filed Jan. 20, 2022, which is assigned to the assignee hereof, and which is expressly incorporated by reference in its entirety herein.

FIELD OF TECHNOLOGY

The following relates to wireless communications, including codebook-based beamforming considerations for reconfigurable surfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems use beamforming or multiple input multiple output (MIMO) for increasing signal throughput. In some cases, reconfigurable surfaces may be employed to extend wireless coverage, for example, by redirecting a beam towards a receiving device.

SUMMARY

The described techniques relate to improved methods, systems, devices, and apparatuses that support codebook-based beamforming considerations for reconfigurable surfaces. Generally, the described techniques provide supporting signaling for codebook generation at a reconfigurable surface. For example, the reconfigurable surface may use antenna elements to redirect signals and the reconfigurable surface may redirect the signals using particular weights. In some cases, the reconfigurable surface may generate a codebook with the particular weights and may reference a codebook when redirecting wireless signals. The weights may be equivalently referred to as "precoders," where the reconfigurable surface may use a different codebook (or non-codebook) precoder for each signal redirection. In some examples, there may be multiple candidate precoder types for codebook-based precoding. In such examples, the reconfigurable surface may transmit capability signaling to the base station, where the capability signaling may include a capability of using one or more precoder types. In response, the base station may indicate, to a controller of the reconfigurable surface, of which codebook type (e.g., precoder type) may be used based on channel measurements.

A method for wireless communication is described. The method may include transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface, receiving, from the first wireless device, an indication of a type of precoder associated with generating the codebook, adjusting one or more of the respective elements in accordance with the weights for the respective elements generated for the codebook based on receiving the indication of the type of precoder and in accordance with a training process for a communication link between the first wireless device and a second wireless device via the set of multiple elements, and receiving, from the first wireless device, an index corresponding to a codeword of the one or more codewords.

An apparatus for wireless communication is described. The apparatus may include a processor, memory coupled with the processor, and instructions stored in the memory. The instructions may be executable by the processor to cause the apparatus to transmit, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface, receive, from the first wireless device, an indication of a type of precoder associated with generating the codebook, adjust one or more of the respective elements in accordance with the weights for the respective elements generated for the codebook based on receiving the indication of the type of precoder and in accordance with a training process for a communication link between the first wireless device and a second wireless device via the set of multiple elements, and receive, from the first wireless device, an index corresponding to a codeword of the one or more codewords.

Another apparatus for wireless communication is described. The apparatus may include means for transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface, means for receiving, from the first wireless device, an indication of a type of precoder associated with generating the codebook, means for adjusting one or more of the respective elements in accordance with the weights for the respective elements generated for the codebook based on receiving the indication of the type of precoder and in accordance with a training process for a communication link between the first wireless device and a second wireless device via the set of multiple elements, and means for receiving, from the first wireless device, an index corresponding to a codeword of the one or more codewords.

A non-transitory computer-readable medium storing code for wireless communication is described. The code may include instructions executable by a processor to transmit, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface, receive, from the first wireless device, an indication of a type of precoder associated with generating the codebook, adjust one or more of the respective elements in accordance with the weights for the respective elements generated for the codebook based on receiving the indication of the type of precoder and in accordance with a training process for a communication link between the first wireless device and a second wireless device via the set of multiple elements, and receive, from the first wireless device, an index corresponding to a codeword of the one or more codewords.

Some examples of the method, apparatuses, and non-transitory computer-readable medium described herein may further include operations, features, means, or instructions for generating the codebook with a first dimension and a second dimension, where the first dimension corresponds to a number of horizontal elements of the set of multiple elements of the reconfigurable surface and the second dimension corresponds to a number of vertical elements of the set of multiple elements of the reconfigurable surface.

In some examples of the method, apparatuses, and non-transitory computer-readable medium described herein, the indication of the capability of using one or more types of precoders includes an indication of a capability of supporting more than one codebook vector, each codebook vector corresponding to a respective portion of the set of multiple elements of the reconfigurable surface and the indication of the type of precoder includes an indication of which codebook vector should be used for each portion of the set of multiple elements of the reconfigurable surface.

Some examples of the method, apparatuses, and non-transitory computer-readable medium described herein may further include operations, features, means, or instructions for generating the codebook including multiple codebook vectors, where generating the codebook for each of the multiple codebook vectors may be based on receiving the indication.

Some examples of the method, apparatuses, and non-transitory computer-readable medium described herein may further include operations, features, means, or instructions for transmitting, to the first wireless device, an indication of a capability of using polarization when redirecting wireless signals, where the codebook, one or more communication beams, or both, may be associated with a polarization.

Some examples of the method, apparatuses, and non-transitory computer-readable medium described herein may further include operations, features, means, or instructions for transmitting, to the first wireless device, an indication of a time required for switching between codewords of the codebook.

In some examples of the method, apparatuses, and non-transitory computer-readable medium described herein, the types of precoders include Legendre polynomial based precoders, discrete fourier transform precoders, fractional fast fourier transform precoders, walsh precoders, hadamard precoders, slepian sequence precoders, or a combination thereof.

In some examples of the method, apparatuses, and non-transitory computer-readable medium described herein, the first wireless device may be a base station and the second wireless device may be a user equipment (UE).

In some examples of the method, apparatuses, and non-transitory computer-readable medium described herein, the first wireless device may be a first sidelink device and the second wireless device may be a second sidelink device.

A method for wireless communication is described. The method may include receiving, from a first wireless device, an indication of a capability of using one or more types of precoders associated with generating a codebook for a reconfigurable surface for redirecting wireless signals, transmitting, to the first wireless device, an indication of a type of precoder based on receiving the capability, receiving one or more reference signals associated with a communication link training process with a second wireless device via the reconfigurable surface, and transmitting, to the second wireless device, an index associated with a reference signal of the one or more reference signals, where the index is transmitted based on the reference signal satisfying a measurement criteria.

An apparatus for wireless communication is described. The apparatus may include a processor, memory coupled with the processor, and instructions stored in the memory. The instructions may be executable by the processor to cause the apparatus to receive, from a first wireless device, an indication of a capability of using one or more types of precoders associated with generating a codebook for a reconfigurable surface for redirecting wireless signals, transmit, to the first wireless device, an indication of a type of precoder based on receiving the capability, receive one or more reference signals associated with a communication link training process with a second wireless device via the reconfigurable surface, and transmit, to the second wireless device, an index associated with a reference signal of the one or more reference signals, where the index is transmitted based on the reference signal satisfying a measurement criteria.

Another apparatus for wireless communication is described. The apparatus may include means for receiving, from a first wireless device, an indication of a capability of using one or more types of precoders associated with generating a codebook for a reconfigurable surface for redirecting wireless signals, means for transmitting, to the first wireless device, an indication of a type of precoder based on receiving the capability, means for receiving one or more reference signals associated with a communication link training process with a second wireless device via the reconfigurable surface, and means for transmitting, to the second wireless device, an index associated with a reference signal of the one or more reference signals, where the index is transmitted based on the reference signal satisfying a measurement criteria.

A non-transitory computer-readable medium storing code for wireless communication is described. The code may include instructions executable by a processor to receive, from a first wireless device, an indication of a capability of using one or more types of precoders associated with generating a codebook for a reconfigurable surface for redirecting wireless signals, transmit, to the first wireless device, an indication of a type of precoder based on receiving the capability, receive one or more reference signals associated with a communication link training process with a second wireless device via the reconfigurable surface, and transmit, to the second wireless device, an index associated with a reference signal of the one or more reference signals, where the index is transmitted based on the reference signal satisfying a measurement criteria.

In some examples of the method, apparatuses, and non-transitory computer-readable medium described herein, the indication of the capability of using one or more types of precoders includes an indication of a capability of supporting more than one codebook vector, each codebook vector corresponding to a respective portion of a set of multiple elements of the reconfigurable surface and the indication of the type of precoder includes an indication of which codebook vector should be used for each portion of the set of multiple elements of the reconfigurable surface.

Some examples of the method, apparatuses, and non-transitory computer-readable medium described herein may further include operations, features, means, or instructions for receiving, from the first wireless device, an indication of a capability of the reconfigurable surface for using polarization when redirecting the wireless signals, where the codebook, one or more communication beams, or both, may be based on a polarization.

Some examples of the method, apparatuses, and non-transitory computer-readable medium described herein may further include operations, features, means, or instructions for receiving, from the first wireless device, an indication of a time associated with the first wireless device switching between codewords of the codebook.

Some examples of the method, apparatuses, and non-transitory computer-readable medium described herein may further include operations, features, means, or instructions for adjusting a timing between one or more signals associated with the communication link training process with the second wireless device based on the time associated with the first wireless device switching between codewords of the codebook.

In some examples of the method, apparatuses, and non-transitory computer-readable medium described herein, the communication link training process includes downlink control information messages, sidelink control information messages, or a combination thereof.

In some examples of the method, apparatuses, and non-transitory computer-readable medium described herein, the types of precoders include Legendre polynomial based precoders, discrete fourier transform precoders, fractional fast fourier transform precoders, walsh precoders, hadamard precoders, slepian sequence precoders, or a combination thereof.

In some examples of the method, apparatuses, and non-transitory computer-readable medium described herein, the first wireless device may be a controller for the reconfigurable surface and the second wireless device may be a UE, a sidelink device, or a combination thereof.

DETAILED DESCRIPTION

Figure 1:
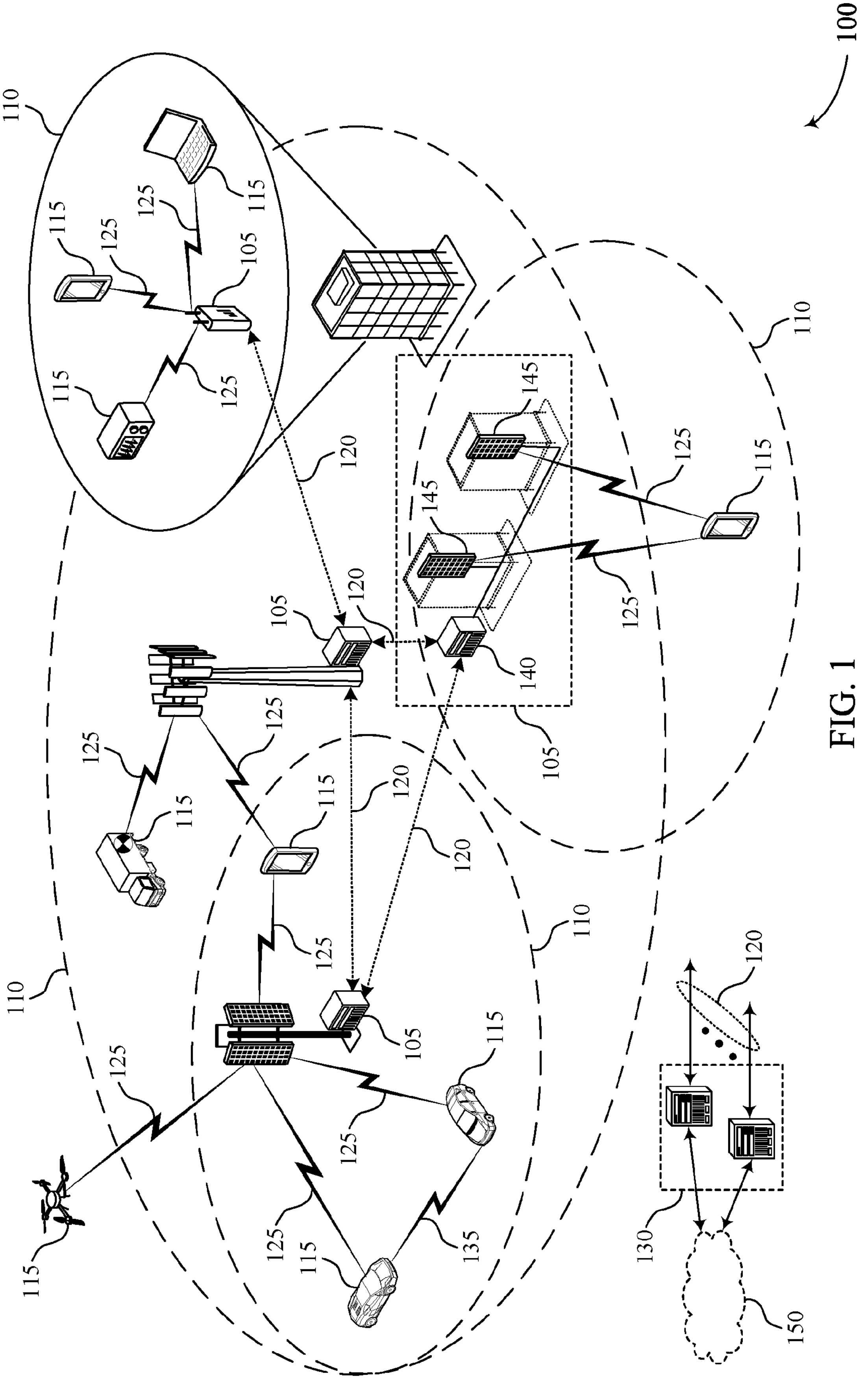
FIGS. 1 and 2 illustrate examples of wireless communications systems that support codebook-based beamforming considerations for reconfigurable surfaces in accordance with aspects of the present disclosure.

Some wireless communications systems use beamforming or multiple input multiple output (MIMO) for increasing signal throughput. In some cases, reconfigurable surfaces may be employed to extend wireless coverage with negligible power consumption. For example, a reconfigurable surface may redirect an a beam transmitted from a base station towards a user equipment (UE) in situations where the base station may not be able to transmit directly to the UE. In some cases, the base station may configure the reconfigurable surface to direct signals to a particular direction, for example, the direction of the UE. The base station may determine a direction for the reconfigurable surface to direct signals based on a reconfigurable surface training process. That is, the UE and the base station may exchange signals, using the reconfigurable surface, to determine a communication beam. In some examples, a transmitting device may transmit a sequence of training reference signals to the reconfigurable surface, where the reconfigurable surface may redirect the reference signals to a receiving device. In such examples, the base station may measure the reference signals redirected from the reconfigurable surface and may determine a communication beam to use to communicate with the UE. A reconfigurable intelligent surface (RIS) may be an example of a reconfigurable surface, and the terms reconfigurable surface and RIS may be used interchangeably.

In some cases, the RIS may use an array of elements to redirect signals and the RIS may redirect the signals using particular weights. In some cases, the RIS may generate a codebook with the particular weights and may reference the codebook when redirecting wireless signals. The weights, in the context of codebook-based beamforming, may be equivalently referred to as "precoders," where the RIS may use a different codebook (or non-codebook) precoder for each training signal occasion. In some examples, there may be multiple candidate precoder types for codebook-based precoding. In such examples, the RIS may transmit capability signaling to the base station, where the capability signaling may include a capability of using one or more precoder types. In response, the base station may indicate, to a controller of the RIS, of which codebook type (e.g., precoder type) may be used based on channel measurements. In some cases, polarization support may change a codebook usage or a codebook design, and thus a selected precoding matrix indicator (PMI), beam, among other communication parameters. In such cases, the RIS may signal a polarization capability to the base station, for example, signaling a capability of redirecting signals using one or more polarization filters. In some examples, the RIS may further indicate a capability to support more than one codebook type, such that the RIS may use different types of precoders for different portions of the RIS elements. Additionally, in some examples, there may be a switching time associated with changing between using different codewords (e.g., associated with pointing to precoders of the codebook). That is, it may take the RIS a switching time to switch between precoders. In such examples, the RIS may transmit timing indication to the base station such that the base station may identify the switching time and may adjust a signal timing between signals in accordance with the switching time.

Aspects of the disclosure are initially described in the context of wireless communications systems. Aspects of the disclosure are then described in the context of antenna diagrams, timing diagrams, and process flows. Aspects of the disclosure are further illustrated by and described with reference to apparatus diagrams, system diagrams, and flowcharts that relate to codebook-based beamforming considerations for RISs.

FIG. 1 illustrates an example of a wireless communications system 100 that supports codebook-based beamforming considerations for RIS surfaces in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T^s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna array's or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may use beamforming or MIMO for increasing signal throughput. In some cases, RISs may be employed to extend wireless coverage with negligible power consumption. For example, an RIS may redirect a beam transmitted from a base station 105 to a UE 115 in situations where the base station 105 may not be able to transmit the beam directly to the UE 115. In some cases, the base station 105 may configure the RIS to direct signals to a particular direction, for example, the direction of the UE 115. The base station 105 may determine a direction for the RIS to direct signals based on an RIS training process. That is, the UE 115 and the base station 105 may exchange signals, using the RIS, to determine a communication beam. In some examples, a transmitting device may transmit a sequence of training reference signals to the RIS, where the RIS may redirect the reference signals to a receiving device. In such examples, the base station 105 may measure the reference signals redirected from the RIS and may determine a communication beam to use to communicate with the UE 115.

In some cases, the RIS may use an array of elements to redirect signals and the RIS may redirect the signals using particular weights. In some cases, the RIS may generate a codebook with the particular weights and may reference the codebook when redirecting wireless signals. The weights, in the context of codebook-based beamforming, may be equivalently referred to as "precoders," where the RIS may use a different codebook (or non-codebook) precoder for each training signal occasion. In some examples, there may be multiple candidate precoder types for codebook-based precoding. In such examples, the RIS may transmit capability signaling to the base station 105, where the capability signaling may include a capability of using one or more precoder types. In response, the base station 105 may indicate, to a controller of the RIS, of which codebook type (e.g., precoder type) may be used based on channel measurements. In some cases, polarization support may change a codebook usage or a codebook design, and thus a selected PMI or beam, among other communication parameters. In such cases, the RIS may signal a polarization capability to the base station 105, for example, signaling a capability of redirecting signals using one or more polarization filters. In some examples, the RIS may further indicate a capability to support more than one codebook type, such that the RIS may use different types of precoders for different portions of the RIS element array. Additionally, in some examples, there may be a switching time associated with changing between using different codewords (e.g., associated with pointing to precoders of the codebook). That is, it may take the RIS a switching time to switch between precoders. In such examples, the RIS may transmit a timing indication to the base station 105 such that the base station 105 may identify the switching time and may adjust a signal timing between signals in accordance with the switching time.

Figure 2:
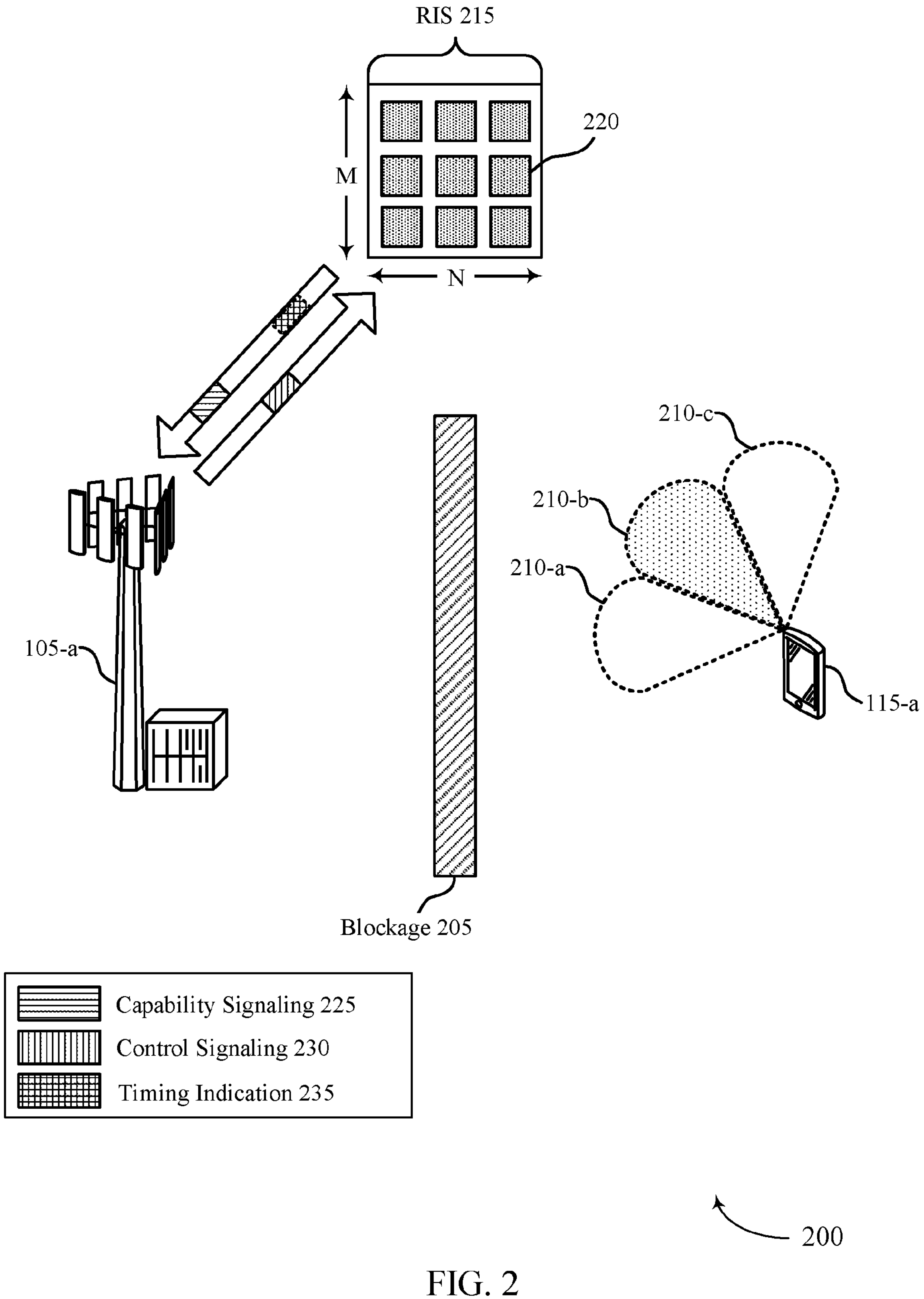

FIG. 2 illustrates an example of a wireless communications system 200 that supports codebook-based beamforming considerations for reconfigurable surfaces in accordance with aspects of the present disclosure. The wireless communications system 200 may implement or be implemented by aspects of the wireless communications system 100. For example, the wireless communications system 200 may include a base station 105-*a* and a UE 115-*a*, which may be examples of corresponding devices described with reference to FIG. 1. The base station 105-*a* and the UE 115-*a* may communicate using an RIS 215, where the RIS 215 may be configurable to redirect signals from the UE 115-*a* to the base station 105-*a* or signals from the base station 105-*a* to the UE 115-*a*. In some examples, the RIS 215 may redirect signals using a codebook with one or more precoders, where the RIS 215 may generate the codebook in accordance with signaling from the base station 105-*a*.

Some wireless communications systems (e.g., 5G massive MIMO (M-MIMO)), use beamforming or MIMO for increasing signal throughput. For example, such wireless communications systems may use active antenna units, resulting in high beamforming gain. Additionally or alternatively, such wireless communications systems may use individual radio frequency chains per antenna port. For example, the base station 105-*a* may communicate with other wireless devices over one or more radio frequency chains using one or more respective antenna ports. In some cases, RISs, such as RIS 215, may be employed to extend wireless coverage (e.g., 5G coverage) with negligible power consumption. For example, RIS 215 may be a near passive device such that RIS 215 may use a relatively low power to redirect signals from a transmitting device to a receiving device. In some cases, the RIS 215 may reflect or refract an impinging wave to a desired direction. For example, the RIS 215 may redirect a signal from the UE 115-*a* to the base station 105-*a* by reflecting the signal, for example, around blockage 205. In some cases, a reflection direction may be controlled by the base station 105-*a*. For example, the base station 105-*a* may configure the RIS 215 to direct signals to a particular direction determined by the base station 105-*a*.

In some cases, RIS 215 training may be performed. That is, wireless devices may exchange signals, using the RIS 215, to determine a communication beam 210. In some examples, a transmitting device may transmit a sequence of training reference sequences towards the RIS 215, where the RIS 215 may redirect the reference sequences to a receiving device. For example, the UE 115-*a* may transmit a sequence of reference signals towards the RIS 215 and the RIS 215 may redirect one or more of the reference signals to the base station 105-*a*. In such examples, the base station 105-*a* may measure the reference signals redirected from the RIS 215 and may determine a communication beam 210 to use to communicate with the UE 115-*a*. The base station 105-*a* may select the index (e.g., associated with communication beam 210-*b*) with a highest receiver metric, such as spectral efficiency, SINR, among other receiver metrics.

In some cases, the RIS 215 may redirect signals with particular weights applied to one or more elements 220. That is, the RIS 215 may use the elements 220 to redirect signals and the RIS 215 may redirect the signals using particular weights. The weights may be phase shifters, magnitude shifters, panel angle shifters, among other weights associated with redirecting wireless signals. In some cases, the RIS 215 may generate a codebook with the particular weights and may reference the codebook when redirecting wireless signals. The weights, in the context of codebook-based beamforming, may be equivalently referred to as "precoders," where the RIS 215 may use a different codebook (or non-codebook) precoder for each training signal occasion (e.g., training reference sequences). Various wireless communications systems may use the techniques as described herein. For example, such ideas may be applicable to Uu links, sidelink (e.g., PC5 interface), among other wireless communications links. In communications systems supporting sidelink communications, the functions performed by the base station 105-*a* may be performed by a sidelink device such as a monitoring UE 115.

In some examples, there may be multiple candidates (e.g., candidate precoder types) for codebook-based precoding. In such examples, the RIS 215 may transmit capability signaling 225 to the base station 105-*a*, where the capability signaling 225 may include a capability of using one or more precoder types. For example, within the capability signaling 225, the RIS 215 may include one or more of a capability of supporting Legendre polynomial based precoders, DFT precoders, Fractional Fast Fourier Transform (FrFFT) precoders, Walsh precoders, Hadamard precoders, Slepian sequences precoders, among other precoder types. In some examples, the RIS 215 may generate a codebook matrix of size N×M, where N may be a number of horizontal elements 220 and M may be a number of vertical elements 220. For example, in wireless communications system 200, the RIS 215 may generate a codebook matrix of size 3×3 on account of the RIS 215 including a 3×3 array of elements 220. The RIS 215 may generate a codebook in accordance with a number of elements 220, a geometry associated with the RIS 215, among other examples. In some examples, the RIS 215 may be over-the-air serving multiple transmissions such that transmitting capability signaling 225 may support the base station 105-*a* (or a monitoring UE 115) signaling a sufficient codebook that the RIS 215 may use.

In response, the base station 105-*a* may indicate, to a controller of the RIS 215, of which codebook type (e.g., precoder type) may be used based on channel measurements. For example, the base station 105-*a* may transmit control signaling 230 to the RIS 215, the control signaling 230 indicating a precoder type of the precoder types indicated in the capability signaling 225. In some examples, the base station 105-*a* may indicate the codebook type based on measurements at the base station 105-*a* (e.g., during an uplink portion of a training process), measurements at the UE 115-*a* (e.g., during a downlink portion of the training process), or a combination thereof.

In some cases, polarization support may change a codebook usage or a codebook design, and thus a selected PMI, beam 210, among other communication parameters. In such cases, the RIS 215 may signal a polarization capability to the base station 105-*a*, for example, signaling a capability of redirecting signals using one or more polarization filters. In some examples, the RIS 215 may transmit the polarization capability within the capability signaling 225 or in another message separate from the capability signaling 225. In other cases, the base station 105-*a* may announce a polarization capability of the RIS 215 to UEs 115. That is, the base station 105-*a* may signal the polarization capability to the UE 115-*a* to inform the UE 115-*a* of the polarization capability of the RIS 215.

In some examples, the RIS 215 may further indicate a capability to support more than one codebook type, such that the RIS 215 may use different types of precoders for different portions of the RIS element array. For example, the RIS 215 may be capable of using a first precoder type for a first portion of elements 220 and a second precoder type for a second portion of elements 220 and the RIS 215 may indicate such a capability to the base station 105-*a*. In some cases, the RIS 215 may indicate the capability to support more than one codebook type in the capability signaling 225 or in a message separate from the capability signaling 225. In response, the base station 105-*a* may indicate which precoder type to use for each respective portion of the antenna array of the RIS 215.

In some examples, the controller of the RIS 215 may have an option to use two different RIS configurations (e.g., RIS beamformers), where each RIS configuration may be associated with a polarization. For example, for a specific polarization, the controller of the RIS 215 may select to use an RIS beamformer associated with the specific polarization. In some example, the RIS 215 may perform a training process for each RIS configuration either jointly or separately. That is, the RIS 215 may perform a training process for each of multiple RIS configurations associated with different polarizations separately, or may perform joint training for the multiple RIS configurations. In other examples, codebooks may be defined separately or defined jointly. For example, the RIS 215 may support one or more codebooks which may be defined independent of, or dependent on, polarization. In such examples, the RIS 215 may support one or more codebooks dependent on a respective one or more polarizations, dependent on an amount of configured polarizations, or the RIS 215 may support codebooks independent of polarization, defined jointly. In some examples, the RIS controller may indicate a number of supported polarizations and the type of polarizations to the base station 105-*a*, the UE 115-*a*, or both. In such examples, the codebook may be based at least in part on the number of supported polarizations, the type of polarizations, or both. For example, the devices in wireless communications system 200 may use a specific codebook depending on how many different polarizations are supported along with the type of supported polarizations.

In some examples, there may be a switching time associated with changing between using different codewords (e.g., associated with pointing to precoders of the codebook). That is, it may take the RIS 215 a switching time to switch between precoders. In such examples, the RIS 215 may transmit timing indication 235 to the base station 105-*a* such that the base station 105-*a* may identify the switching time and may adjust a signal timing, such as a timing between signals of a training process, in accordance with the switching time.

Configuring wireless communications systems with signaling supporting codebook generation at the RIS 215 may enhance coordination between communication devices, such as in M-MIMO systems. Further, configuring devices to use the techniques as described herein may enhance communications with RISs 215, resulting in higher beamforming gain (e.g., as compared to scenarios using non-intelligent antenna units or surfaces).

Figure 3:
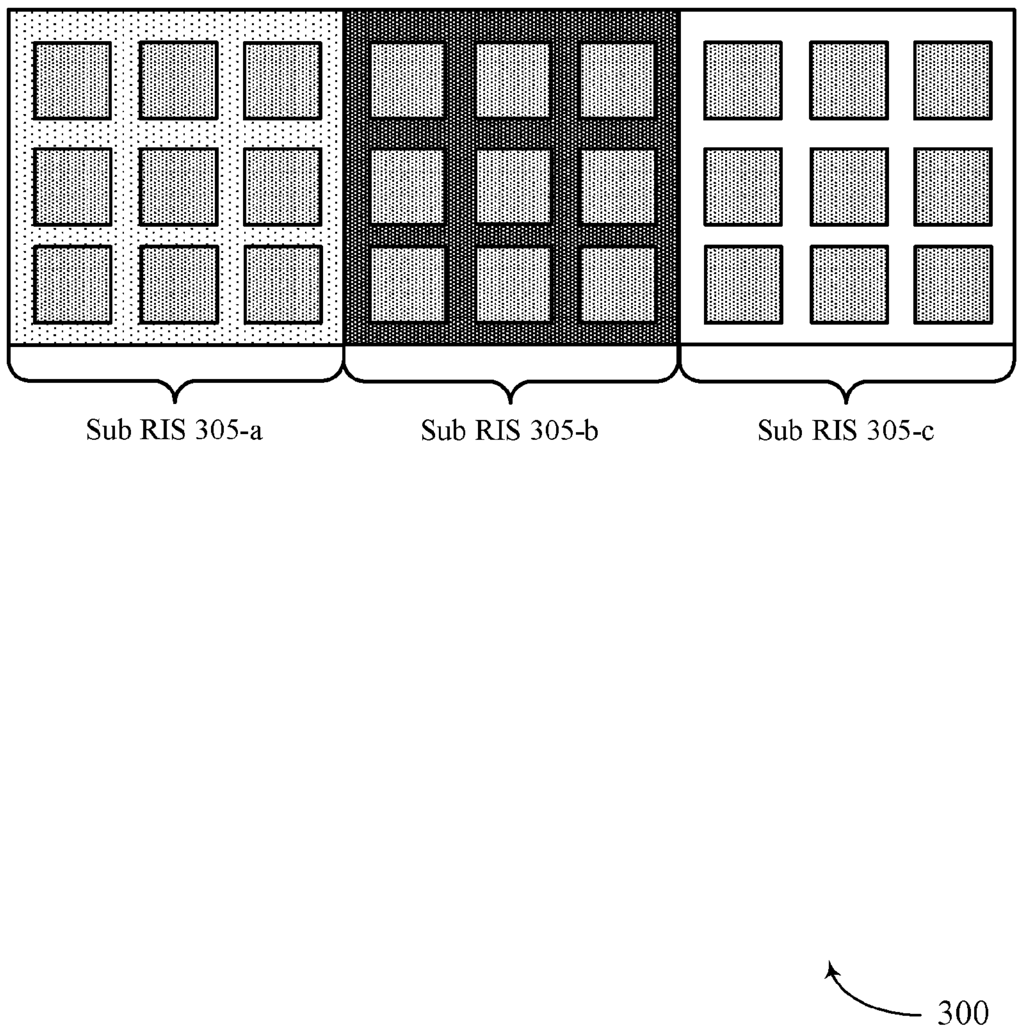
FIG. 3 illustrates an example of a diagram of a reconfigurable surface that supports codebook-based beamforming considerations for reconfigurable surfaces in accordance with aspects of the present disclosure.

FIG. 3 illustrates an example of a diagram 300 of a reconfigurable surface that supports codebook-based beamforming considerations for reconfigurable surfaces in accordance with aspects of the present disclosure. Diagram 300 may implement or be implemented by aspects of the wireless communications system 200. For example, the diagram 300 may be implemented at an RIS such as RIS 215 as described with reference to FIG. 2, where the RIS 215 may be configurable to redirect signals from one wireless device to another. In some examples, RISs may redirect signals using codebooks with one or more precoders, where such RISs may generate codebooks in accordance with signaling from a communicating device (e.g., a base station, a monitoring UE).

In antenna diagram 300, the RIS may include multiple sub-RISs 305, for example, three sub-RISs 305. In some examples, an RIS surface may have a relatively large number of elements and size, hence, resulting in channel conditions changing from one cluster (e.g., sub-RIS 305) to the other. For example, channel conditions at sub-RIS 305-*a* may be sufficient for communications (e.g., associated with a relatively high throughput) and channel conditions at sub-RIS 305-*c* may be poor (e.g., associated with a relatively low throughput). In such cases, the RIS may support the use of a cluster-based codebook, where each sub-RIS 305 may be associated with a respective codebook. For example, sub-RIS 305-*a* may correspond to a first codebook, sub-RIS 305-*b* may correspond to a second codebook, and sub-RIS 305-*c* may correspond to a third codebook. In some examples, sub-RISs 305 may use the same or different codebooks.

In some examples, a base station may indicate, to a controller of the RIS, which codebook should be used for each sub-RIS 305. For example, The base station may indicate, to the RIS controller, a first codebook for the sub-RIS 305-*a*, a second codebook for the sub-RIS 305-*b*, and a third codebook for the sub-RIS 305-*c*. In some cases, the base station may indicate the codebooks based on measurements at the base station, one or more UEs, or a combination thereof. For example, the base station may perform measurements on channels associated with each sub-RIS 305 and may indicate codebooks for each sub-RIS 305 based thereon. In some examples, the RIS may generate a codebook vector, for every small cluster, or part of the RIS elements (e.g., with size M1×N1). In some examples, while training (e.g., exchanging signaling to determine communication parameters), all sub-RISs 305 may train contemporaneously with corresponding codebooks. That is, each sub-RIS 305 may use a corresponding codebook (e.g., signaled from the base station) during a reference signal training process. For example, at a same time, sub-RIS 305-*a* may redirect training signals using a first codebook, sub-RIS 305-*b* may redirect training signals using a second codebook, and sub-RIS 305-*c* may redirect training signals using a third codebook. Notably, base stations and UEs communicating using the RIS may be unaware of the codebook vectors (or matrix) used by the RIS at a time, but the base station may transmit indications to each sub-RIS 305 on which codebook to use.

In some examples, the RIS controller may signal a capability to support more than one codebook at a time. That is, the RIS may be capable of using respective codebooks for each sub-RIS 305. As such, the RIS controller may signal, to the base station, a capability of supporting more than one codebook. In response, the base station may transmit a codebook indication to the RIS controller, for example, configuring the RIS with a first codebook at sub-RIS 305-*a*, a second codebook at sub-RIS 305-*b*, and a third codebook at sub-RIS 305-*c*.

Figure 4:
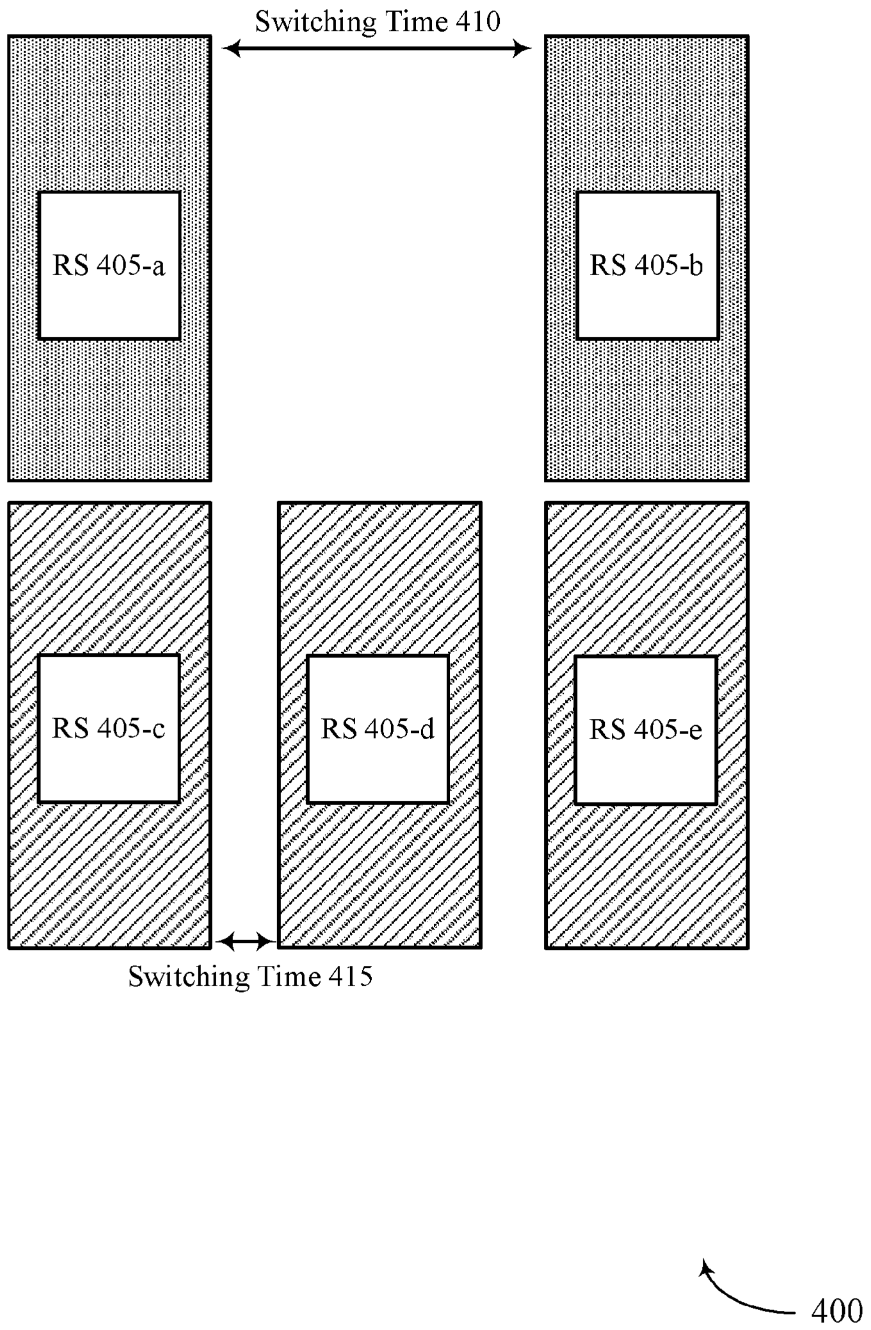
FIG. 4 illustrates an example of a timing diagram that supports codebook-based beamforming considerations for reconfigurable surfaces in accordance with aspects of the present disclosure.

FIG. 4 illustrates an example of a timing diagram 400 that supports codebook-based beamforming considerations for RIS surfaces in accordance with aspects of the present disclosure. Timing diagram 400 may implement or be implemented by aspects of the wireless communications system 200. For example, the timing diagram 400 may be associated with a training signal process between a base station, a UE, and an RIS. In some examples, RISs may redirect reference signals such as reference signal (RS) 405-*a*, RS 405-*b*, RS 405-*c*, RS 405-*d*, and RS 405-*e* in accordance with the timing diagram 400.

In some examples, codebooks may have less possibilities or ranges of values than others (e.g., in terms of range of parameters). For example, Walsh precoders and Hadamard precoders may have a codebook range of −1 to 1. As such, a switching time between writing or modifying a codebook vector at the RIS surface, when a Walsh codebook is used may be much less than when a DFT codebook is used. For example, RS 405-*a* and RS 405-*b* may be associated with redirecting signals according to a DFT codebook and RS 405-*c*, RS 405-*d*, and RS 405-*e* may be associated with redirecting signals according to a Walsh codebook. In such examples, switching time 410, may be the time it takes for an RIS redirecting RS 405-*a* and RS 405-*b* to write or modify a DFT codeword at the RIS surface. In comparison, switching time 415, associated with writing or modifying Walsh codewords at the RIS surface may be much less than the switching time 410, for example, due to the relatively small codebook range of the Walsh codebook as compared to the codebook range of the DFT codebook.

In some examples, based on how advanced the RIS controller is and how quick the RIS controller may write values on the RIS surface, the RIS controller may signal the time required between writing one codebook vector to another under each proposed codebook-based scheme. That is, the RIS controller may signal a switching time, such as switching time 410, switching time 415, or both, to the base station. Signaling such switching times may enable the base station to adjust a timing between two adjacent reference signals while performing beam training. For example, the base station may receive the indication of switching time 410 and may adjust the time between RS 405-*a* and RS 405-*b* in accordance with switching time 410. Additionally, signaling such switching times may enable the base station to adjust a timing between downlink control information (DCI) (e.g., configuring a communication beam) or transmissions where the RIS is involved. In such cases, simple precoders, or precoders associated with a relatively short switching time, may be associated with better average performance as compared to precoders associated with a longer switching time when taking the switching time into account.

Figure 5:
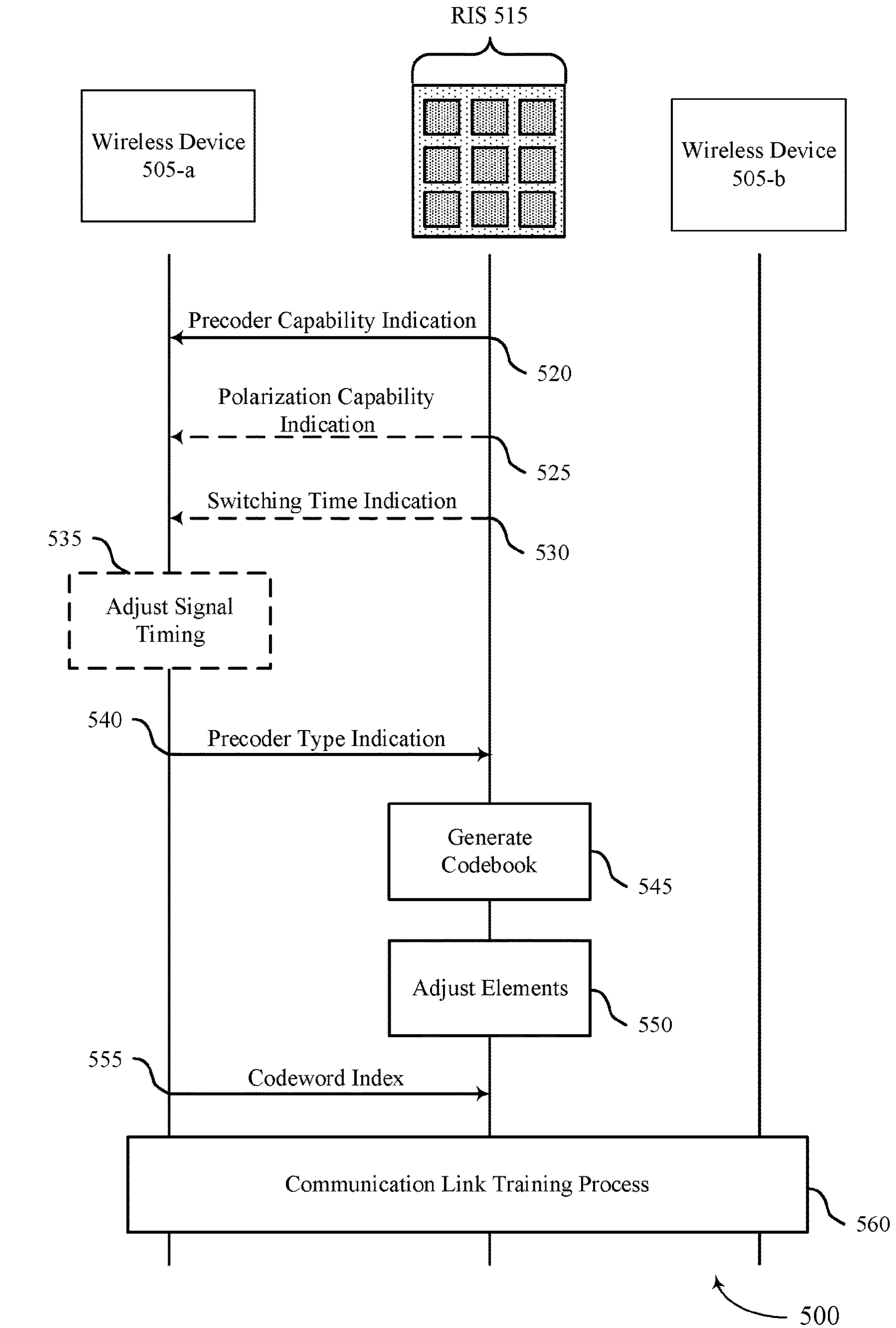
FIG. 5 illustrates an example of a process flow that supports codebook-based beamforming considerations for reconfigurable surfaces in accordance with aspects of the present disclosure.

FIG. 5 illustrates an example of a process flow 500 that supports codebook-based beamforming considerations for reconfigurable surfaces in accordance with aspects of the present disclosure. In some examples, the process flow 500 may implement aspects of wireless communications systems 100 or 200. For example, process flow 500 may include a wireless device 505-*a*, a wireless device 505-*b*, and an RIS 515, which may be examples of corresponding devices as described with reference to FIGS. 1 through 4. In some examples, wireless device 505-*a*, wireless device 505-*b*, or both, may be examples of UEs 115, base stations 105, sidelink enabled devices, or other wireless devices as described with reference to FIGS. 1 through 4. In some examples, the wireless device 505-*a* and the wireless device 505-*b* may communicate via the RIS 515, where the RIS may be configured to redirect signals from wireless device 505-*a* to wireless device 505-*b* or from wireless device 505-*b* to wireless device 505-*a*.

In the following description of the process flow 500, the operations may be performed (e.g., reported or provided) in a different order than the order shown, or the operations performed by the wireless device 505-*a*, the wireless device 505-*b*, and the RIS 515 may be performed in different orders or at different times. For example, specific operations also may be left out of the process flow 500, or other operations may be added to the process flow 500. Further, although some operations or signaling may be shown to occur at different times for discussion purposes, these operations may actually occur at the same time.

At 520, the RIS 515 may transmit a precoder capability indication to the wireless device 505-*a*. For example, the RIS 515 may transmit, to the wireless device 505-*a*, an indication of a capability of using one or more types of precoders associated with generating a codebook for a reconfigurable surface for redirecting wireless signals, where the codebook includes one or more codewords associated with weights for respective elements of a plurality of elements of the reconfigurable surface. In some examples, the indication of the capability of using one or more precoders may include an indication of a capability of supporting more than one codebook vector, each codebook vector corresponding to a respective portion of the plurality of elements of the reconfigurable surface (e.g., one or more sub-RISs 305 as described with reference to FIG. 3). In some examples, the types of precoders may include Legendre polynomial based precoders, DFT precoders, FrFFT precoders, Walsh precoders, Hadamard precoders, Slepian sequence precoders or a combination thereof.

In some examples, at 525, the RIS 515 may transmit a polarization capability indication to the wireless device 505-*a*. That is, the RIS 515 may transmit, to the wireless device 505-*a*, an indication of a capability of using polarization when redirecting wireless signals, where the codebook, one or more communication beams, or both, may be associated with a polarization.

In some examples, at 530, the RIS 515 may transmit a switching time indication to the wireless device 505-*a*. That is, the RIS 515 may transmit, to the wireless device 505-*a*, an indication of a time required for switching between codewords of the codebook. For example, the RIS 515 may transmit a switching time 410, as described with reference to FIG. 4, to the wireless device 505-*a*.

In some examples, at 535, the wireless device 505-*a* may adjust a signal timing. For example, the wireless device 505-*a* may adjust a timing between one or more signals associated with a communication link training process with the wireless device 505-*b* based on the time associated with the RIS 515 switching between codewords of the codebook.

At 540, the wireless device 505-*a* may transmit, and the RIS 515 may receive, a precoder type indication. For example, the RIS 515 may receive, from the wireless device 505-*a*, an indication of a type of precoder associated with generating the codebook. In some cases, the indication of the type of precoder may include an indication of which codebook vector should be used for each portion of the plurality of elements of the reconfigurable surface, for example, if the indication of the capability of using one or more types of precoders includes an indication of a capability of supporting more than one codebook vector. In some cases, the wireless device 505-*a* may transmit the precoder type indication based on channel measurements performed by the wireless device 505-*a*, the wireless device 505-*b*, or both.

At 545, the RIS 515 may generate the codebook. In some examples, the RIS 515 may generate the codebook with a first dimension and a second dimension, where the first dimension may correspond to a number of horizontal elements of the plurality of elements of the reconfigurable surface and the second dimension corresponds to a number of vertical elements of the plurality of elements of the reconfigurable surface. Additionally or alternatively, the RIS 515 may generate the codebook including multiple codebook vectors, where generating the codebook for each of the multiple codebook vectors may be based at least in part on receiving the indication at 540.

At 550, the RIS 515 may adjust one or more elements. That is, the RIS 515 may adjust one or more of the respective elements in accordance with the weights for the respective elements generated for the codebook based at least in part on receiving the indication of the type of precoder and in accordance with a training process for a communication link between the wireless device 505-*a* and the wireless device 505-*b* via the plurality of elements.

At 555, the wireless device 505-*a* may transmit, and the RIS 515 may receive, a codeword index. That is, the RIS 515 may receive, from the wireless device 505-*a*, an index corresponding to a codeword of the one or more codewords, for example, to adjust an element a the RIS 515 for redirecting wireless signals.

At 560, the wireless device 505-*a*, the wireless device 505-*b*, and the RIS 515 may perform a communication link training process supported by the RIS 515 redirecting wireless signals using the generated codebook.

Figure 6:
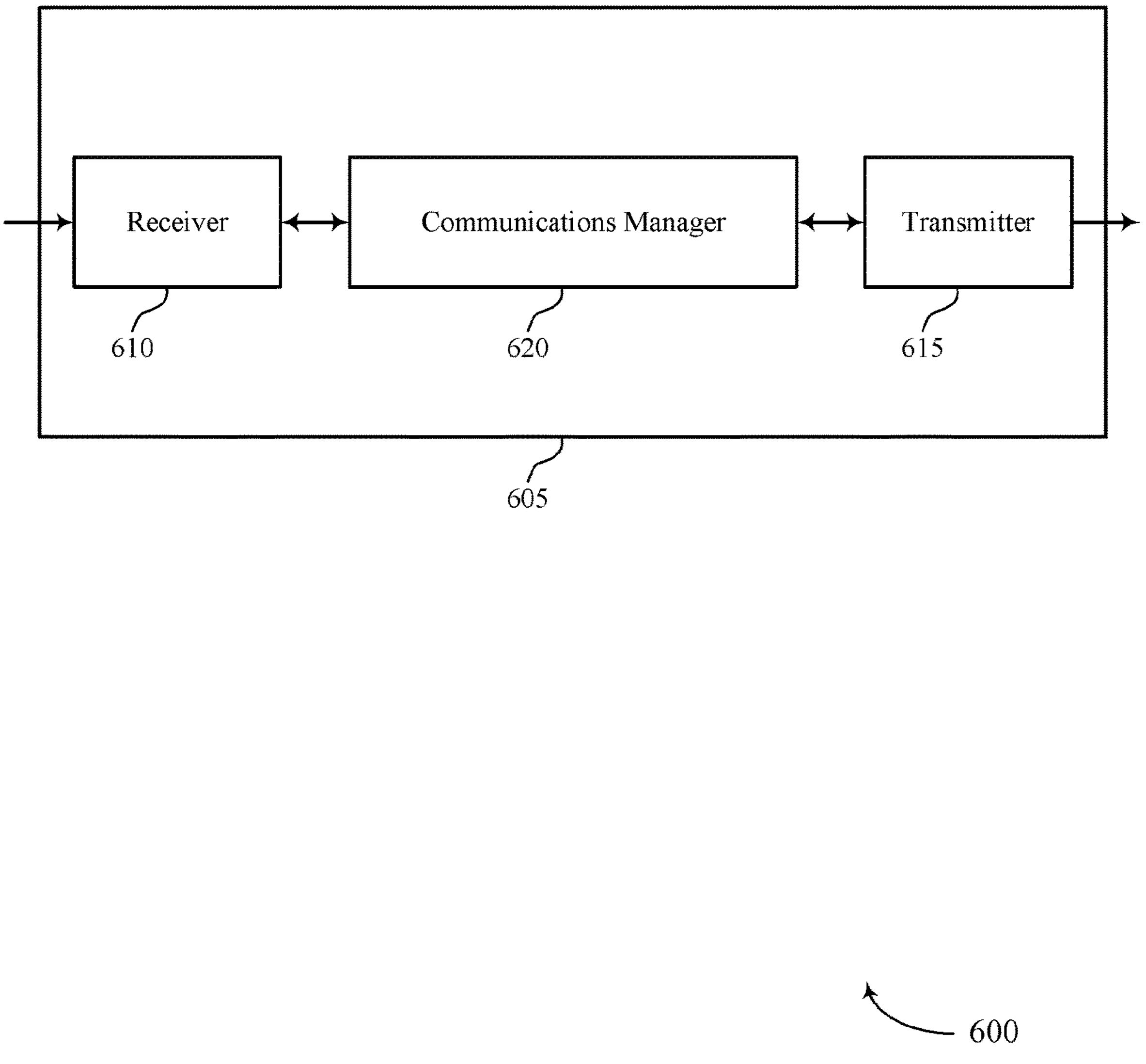
FIGS. 6 and 7 show block diagrams of devices that support codebook-based beamforming considerations for reconfigurable surfaces in accordance with aspects of the present disclosure.

FIG. 6 shows a block diagram 600 of a device 605 that supports codebook-based beamforming considerations for RIS surfaces in accordance with aspects of the present disclosure. The device 605 may be an example of aspects of a wireless device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to codebook-based beamforming considerations for RIS surfaces). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to codebook-based beamforming considerations for RIS surfaces). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of codebook-based beamforming considerations for RIS surfaces as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. For example, the communications manager 620 may be configured as or otherwise support a means for transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The communications manager 620 may be configured as or otherwise support a means for receiving, from the first wireless device, an indication of a type of precoder associated with generating the codebook. The communications manager 620 may be configured as or otherwise support a means for adjusting one or more of the respective elements in accordance with the weights for the respective elements generated for the codebook based on receiving the indication of the type of precoder and in accordance with a training process for a communication link between the first wireless device and a second wireless device via the set of multiple elements. The communications manager 620 may be configured as or otherwise support a means for receiving, from the first wireless device, an index corresponding to a codeword of the one or more codewords.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for codebook generation at an RIS, for example, supporting precoder capability signaling, polarization capability signaling, and switching time signaling resulting in more efficient communications between a UE and a base station, enhanced MIMO capability, among other examples.

Figure 7:
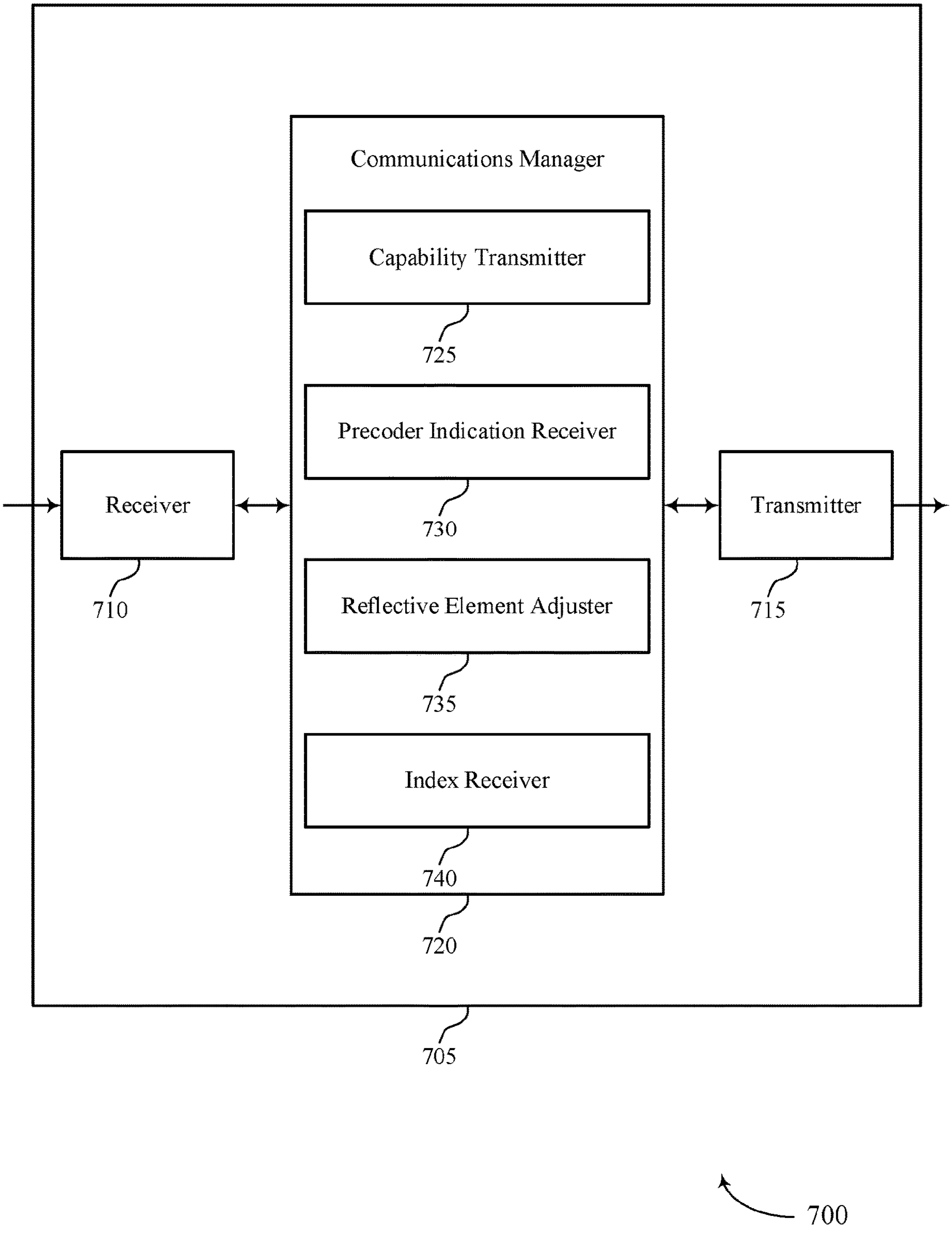

FIG. 7 shows a block diagram 700 of a device 705 that supports codebook-based beamforming considerations for RIS surfaces in accordance with aspects of the present disclosure. The device 705 may be an example of aspects of a device 605 or a wireless device (e.g., an RIS) as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to codebook-based beamforming considerations for RIS surfaces). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to codebook-based beamforming considerations for RIS surfaces). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of codebook-based beamforming considerations for RIS surfaces as described herein. For example, the communications manager 720 may include a capability transmitter 725, a precoder indication receiver 730, a reflective element adjuster 735, an index receiver 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication in accordance with examples as disclosed herein. The capability transmitter 725 may be configured as or otherwise support a means for transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The precoder indication receiver 730 may be configured as or otherwise support a means for receiving, from the first wireless device, an indication of a type of precoder associated with generating the codebook. The reflective element adjuster 735 may be configured as or otherwise support a means for adjusting one or more of the respective elements in accordance with the weights for the respective elements generated for the codebook based on receiving the indication of the type of precoder and in accordance with a training process for a communication link between the first wireless device and a second wireless device via the set of multiple elements. The index receiver 740 may be configured as or otherwise support a means for receiving, from the first wireless device, an index corresponding to a codeword of the one or more codewords.

Figure 8:
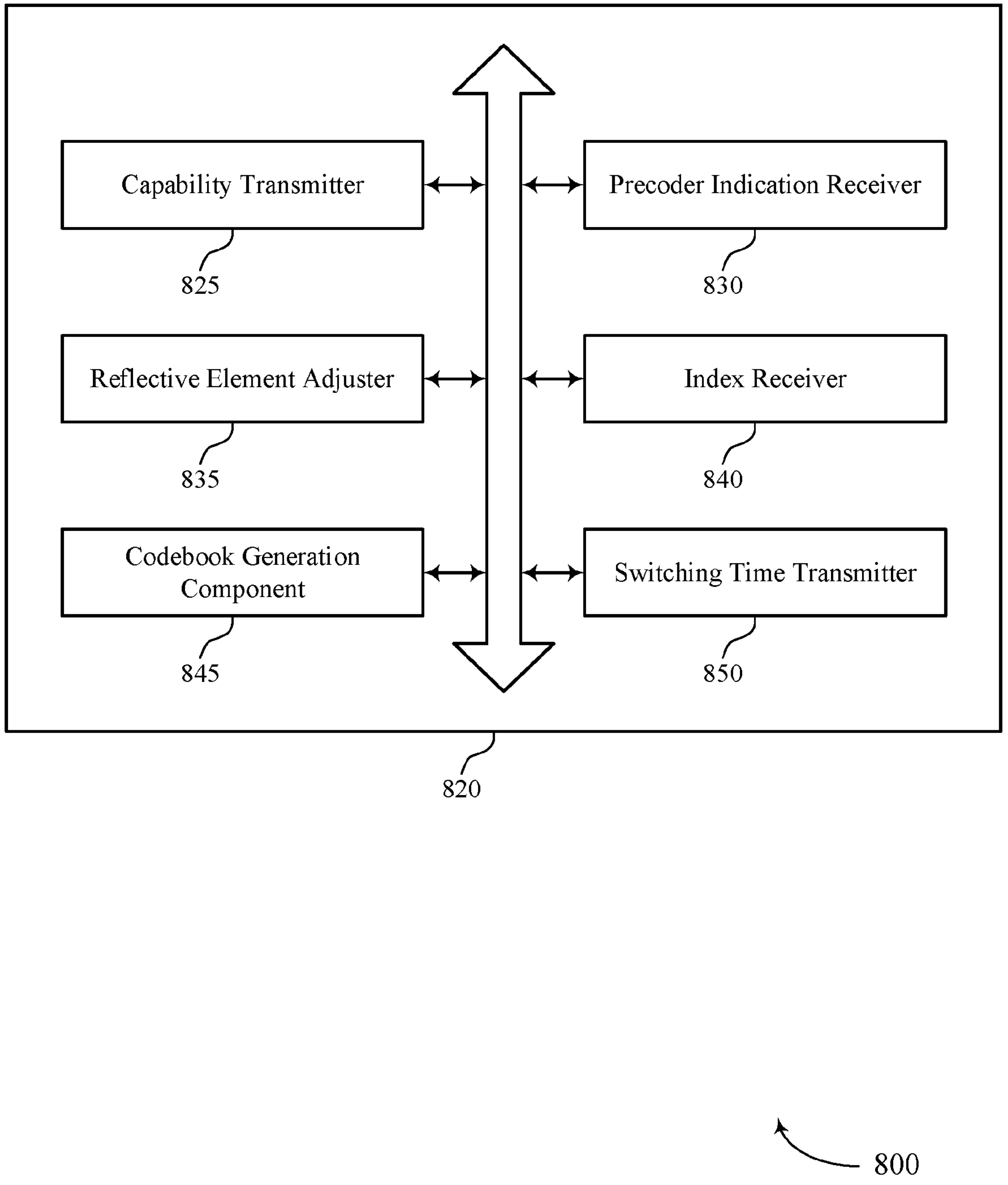
FIG. 8 shows a block diagram of a communications manager that supports codebook-based beamforming considerations for reconfigurable surfaces in accordance with aspects of the present disclosure.

FIG. 8 shows a block diagram 800 of a communications manager 820 that supports codebook-based beamforming considerations for RIS surfaces in accordance with aspects of the present disclosure. The communications manager 820 may be an example of aspects of a communications manager 620, a communications manager 720, or both, as described herein. The communications manager 820, or various components thereof, may be an example of means for performing various aspects of codebook-based beamforming considerations for RIS surfaces as described herein. For example, the communications manager 820 may include a capability transmitter 825, a precoder indication receiver 830, a reflective element adjuster 835, an index receiver 840, a codebook generation component 845, a switching time transmitter 850, or any combination thereof. Each of these components may communicate, directly or indirectly, with one another (e.g., via one or more buses).

The communications manager 820 may support wireless communication in accordance with examples as disclosed herein. The capability transmitter 825 may be configured as or otherwise support a means for transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The precoder indication receiver 830 may be configured as or otherwise support a means for receiving, from the first wireless device, an indication of a type of precoder associated with generating the codebook. The reflective element adjuster 835 may be configured as or otherwise support a means for adjusting one or more of the respective elements in accordance with the weights for the respective elements generated for the codebook based on receiving the indication of the type of precoder and in accordance with a training process for a communication link between the first wireless device and a second wireless device via the set of multiple elements. The index receiver 840 may be configured as or otherwise support a means for receiving, from the first wireless device, an index corresponding to a codeword of the one or more codewords.

In some examples, the codebook generation component 845 may be configured as or otherwise support a means for generating the codebook with a first dimension and a second dimension, where the first dimension corresponds to a number of horizontal elements of the set of multiple elements of the reconfigurable surface and the second dimension corresponds to a number of vertical elements of the set of multiple elements of the reconfigurable surface.

In some examples, the indication of the capability of using one or more types of precoders includes an indication of a capability of supporting more than one codebook vector, each codebook vector corresponding to a respective portion of the set of multiple elements of the reconfigurable surface. In some examples, the indication of the type of precoder includes an indication of which codebook vector should be used for each portion of the set of multiple elements of the reconfigurable surface.

In some examples, the codebook generation component 845 may be configured as or otherwise support a means for generating the codebook including multiple codebook vectors, where generating the codebook for each of the multiple codebook vectors is based on receiving the indication.

In some examples, the capability transmitter 825 may be configured as or otherwise support a means for transmitting, to the first wireless device, an indication of a capability of using polarization when redirecting wireless signals, where the codebook, one or more communication beams, or both, are associated with a polarization.

In some examples, the switching time transmitter 850 may be configured as or otherwise support a means for transmitting, to the first wireless device, an indication of a time required for switching between codewords of the codebook.

In some examples, the types of precoders include Legendre polynomial based precoders, DFT precoders, FrFFT precoders, Walsh precoders, Hadamard precoders, Slepian sequence precoders, or a combination thereof.

In some examples, the first wireless device is a base station and the second wireless device is a UE.

In some examples, the first wireless device is a first sidelink device and the second wireless device is a second sidelink device.

Figure 9:
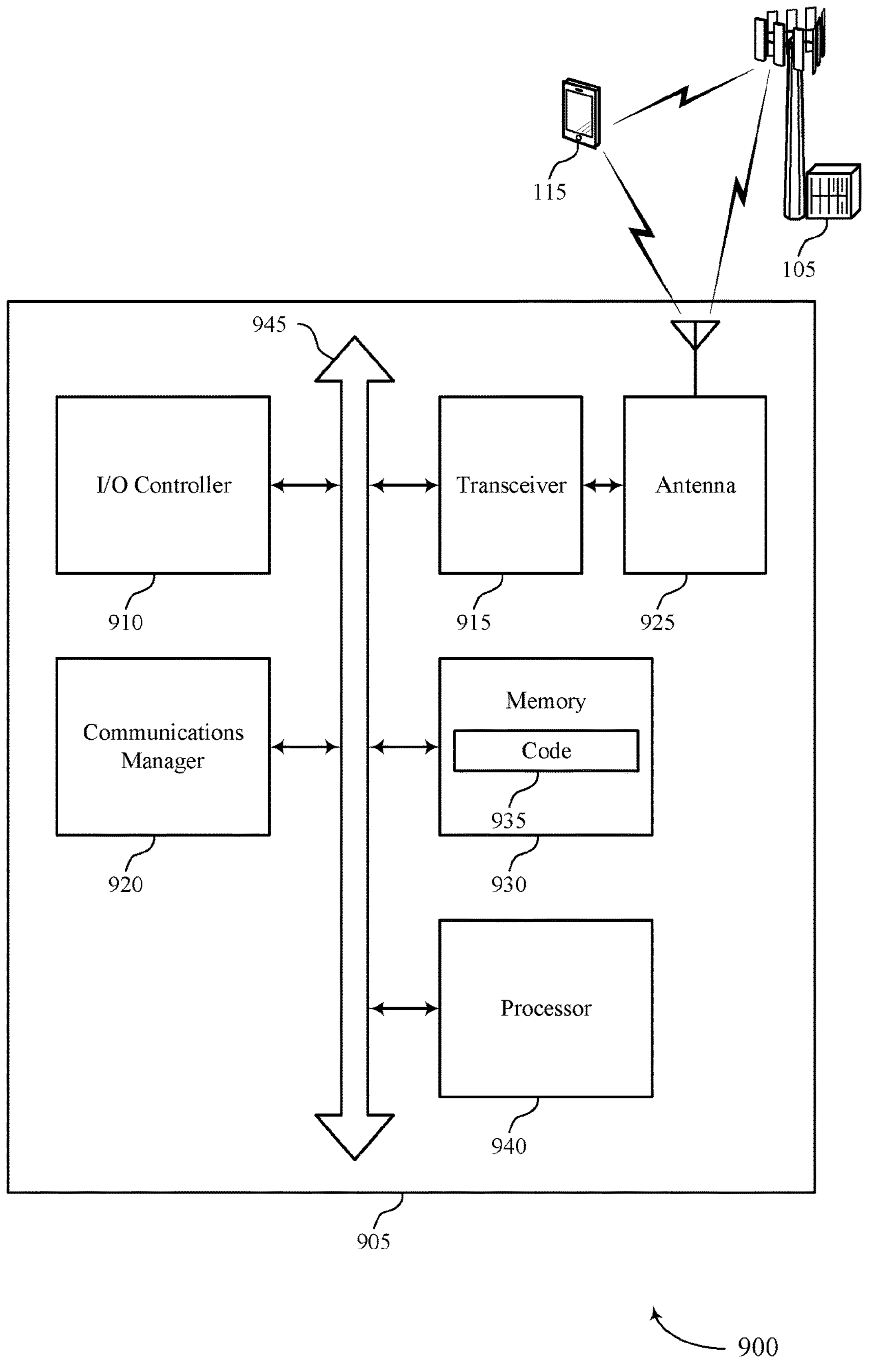
FIG. 9 shows a diagram of a system including a device that supports codebook-based beamforming considerations for reconfigurable surfaces in accordance with aspects of the present disclosure.

FIG. 9 shows a diagram of a system 900 including a device 905 that supports codebook-based beamforming considerations for RIS surfaces in accordance with aspects of the present disclosure. The device 905 may be an example of or include the components of a device 605, a device 705, or a wireless device as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting codebook-based beamforming considerations for RIS surfaces). For example, the device 905 or a component of the device 905 may include a processor 940 and memory 930 coupled to the processor 940, the processor 940 and memory 930 configured to perform various functions described herein.

The communications manager 920 may support wireless communication in accordance with examples as disclosed herein. For example, the communications manager 920 may be configured as or otherwise support a means for transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The communications manager 920 may be configured as or otherwise support a means for receiving, from the first wireless device, an indication of a type of precoder associated with generating the codebook. The communications manager 920 may be configured as or otherwise support a means for adjusting one or more of the respective elements in accordance with the weights for the respective elements generated for the codebook based on receiving the indication of the type of precoder and in accordance with a training process for a communication link between the first wireless device and a second wireless device via the set of multiple elements. The communications manager 920 may be configured as or otherwise support a means for receiving, from the first wireless device, an index corresponding to a codeword of the one or more codewords.

By including or configuring the communications manager 920 in accordance with examples as described herein, the device 905 may support techniques for codebook generation at an RIS, for example, supporting precoder capability signaling, polarization capability signaling, and switching time signaling resulting in more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of codebook-based beamforming considerations for RIS surfaces as described herein, or the processor 940 and the memory 930 may be otherwise configured to perform or support such operations.

Figure 10:
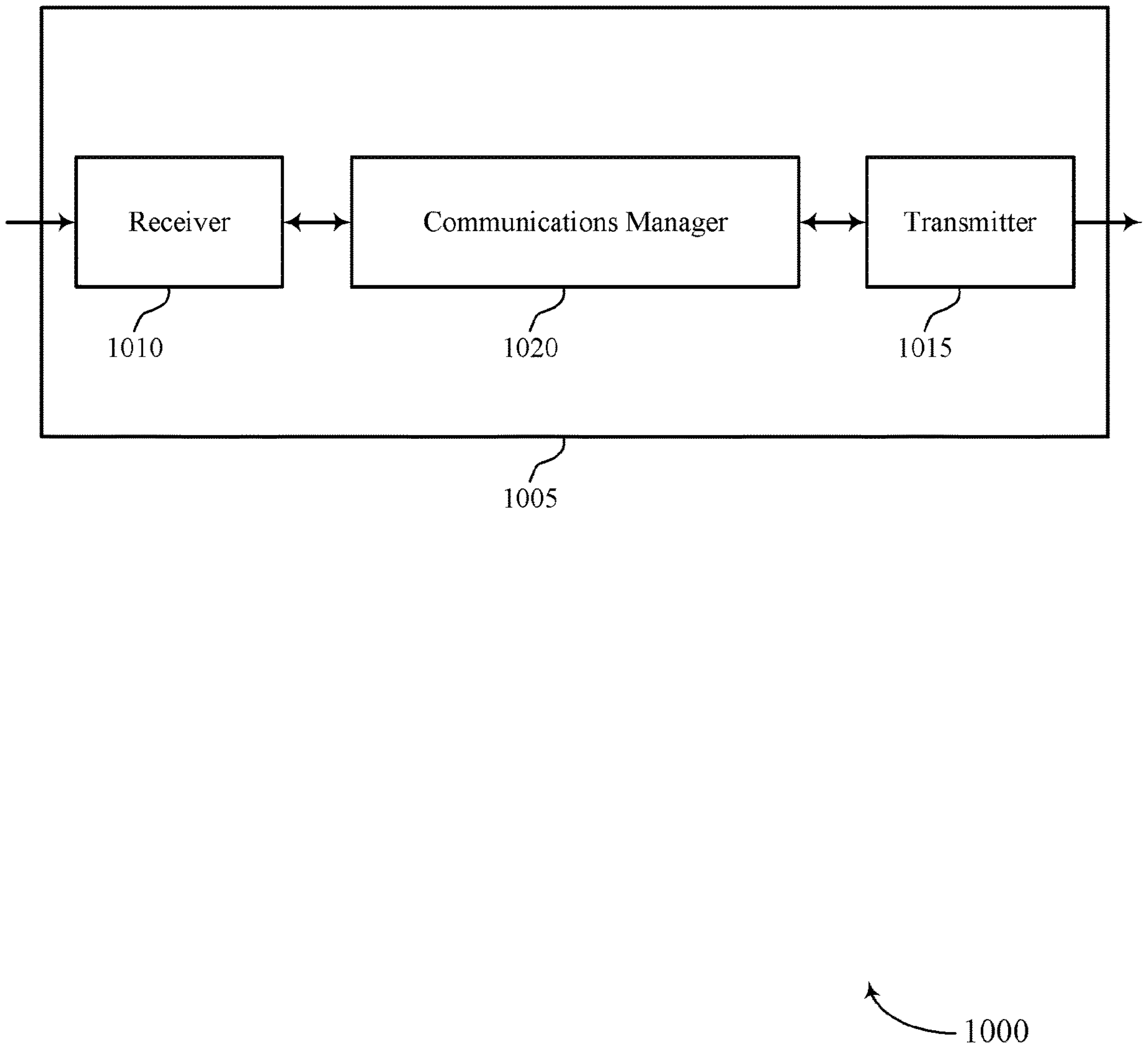
FIGS. 10 and 11 show block diagrams of devices that support codebook-based beamforming considerations for reconfigurable surfaces in accordance with aspects of the present disclosure.

FIG. 10 shows a block diagram 1000 of a device 1005 that supports codebook-based beamforming considerations for RIS surfaces in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to codebook-based beamforming considerations for RIS surfaces). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to codebook-based beamforming considerations for RIS surfaces). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of codebook-based beamforming considerations for RIS surfaces as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication in accordance with examples as disclosed herein. For example, the communications manager 1020 may be configured as or otherwise support a means for receiving, from a first wireless device, an indication of a capability of using one or more types of precoders associated with generating a codebook for a reconfigurable surface for redirecting wireless signals. The communications manager 1020 may be configured as or otherwise support a means for transmitting, to the first wireless device, an indication of a type of precoder based on receiving the capability. The communications manager 1020 may be configured as or otherwise support a means for receiving one or more reference signals associated with a communication link training process with a second wireless device via the reconfigurable surface. The communications manager 1020 may be configured as or otherwise support a means for transmitting, to the second wireless device, an index associated with a reference signal of the one or more reference signals, where the index is transmitted based on the reference signal satisfying a measurement criteria.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for codebook generation at an RIS, for example, supporting precoder capability signaling, polarization capability signaling, and switching time signaling resulting in more efficient communications between a UE and a base station, enhanced MIMO capability, among other examples.

Figure 11:
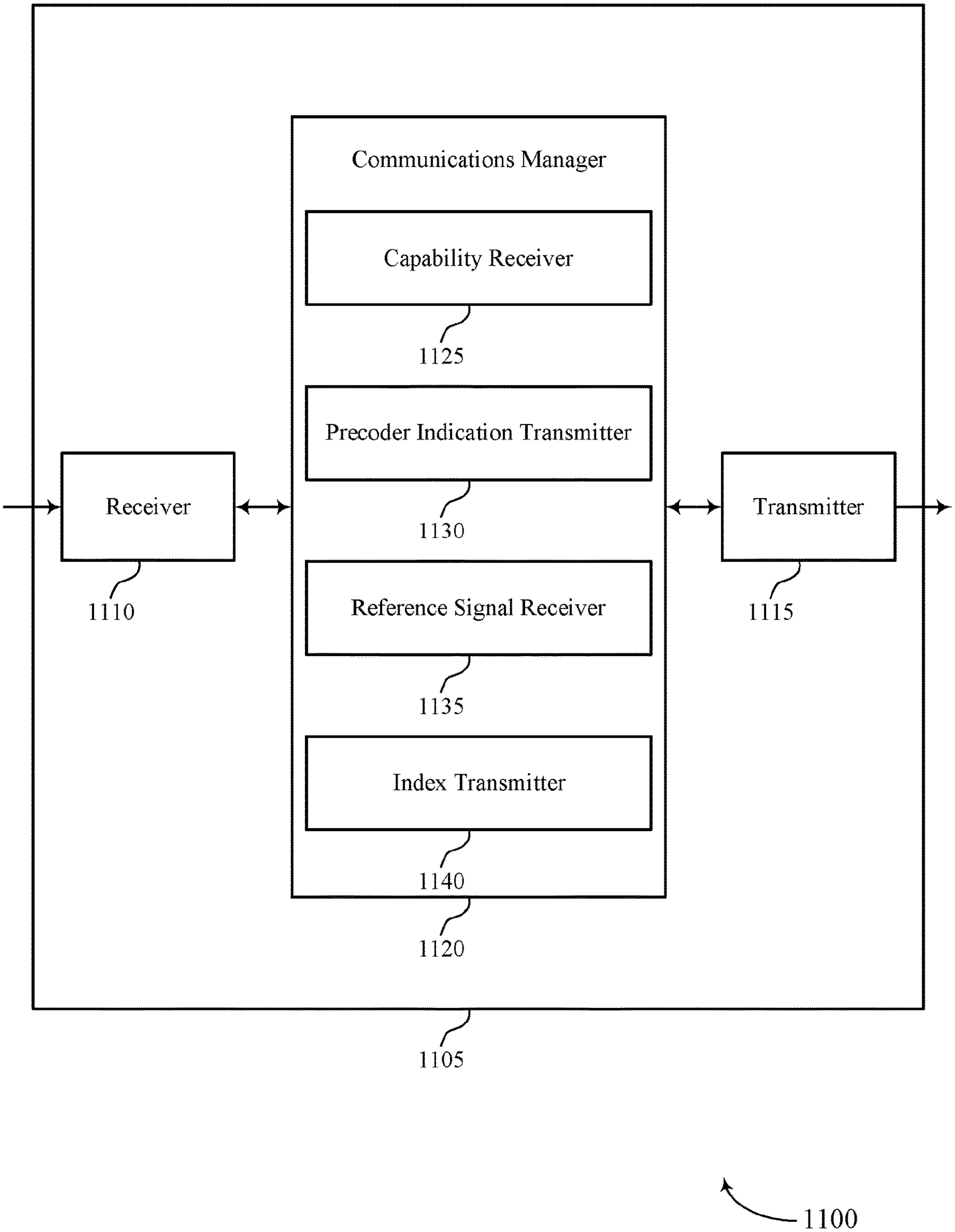

FIG. 11 shows a block diagram 1100 of a device 1105 that supports codebook-based beamforming considerations for RIS surfaces in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to codebook-based beamforming considerations for RIS surfaces). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to codebook-based beamforming considerations for RIS surfaces). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of codebook-based beamforming considerations for RIS surfaces as described herein. For example, the communications manager 1120 may include a capability receiver 1125, a precoder indication transmitter 1130, a reference signal receiver 1135, an index transmitter 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication in accordance with examples as disclosed herein. The capability receiver 1125 may be configured as or otherwise support a means for receiving, from a first wireless device, an indication of a capability of using one or more types of precoders associated with generating a codebook for a reconfigurable surface for redirecting wireless signals. The precoder indication transmitter 1130 may be configured as or otherwise support a means for transmitting, to the first wireless device, an indication of a type of precoder based on receiving the capability. The reference signal receiver 1135 may be configured as or otherwise support a means for receiving one or more reference signals associated with a communication link training process with a second wireless device via the reconfigurable surface. The index transmitter 1140 may be configured as or otherwise support a means for transmitting, to the second wireless device, an index associated with a reference signal of the one or more reference signals, where the index is transmitted based on the reference signal satisfying a measurement criteria.

Figure 12:
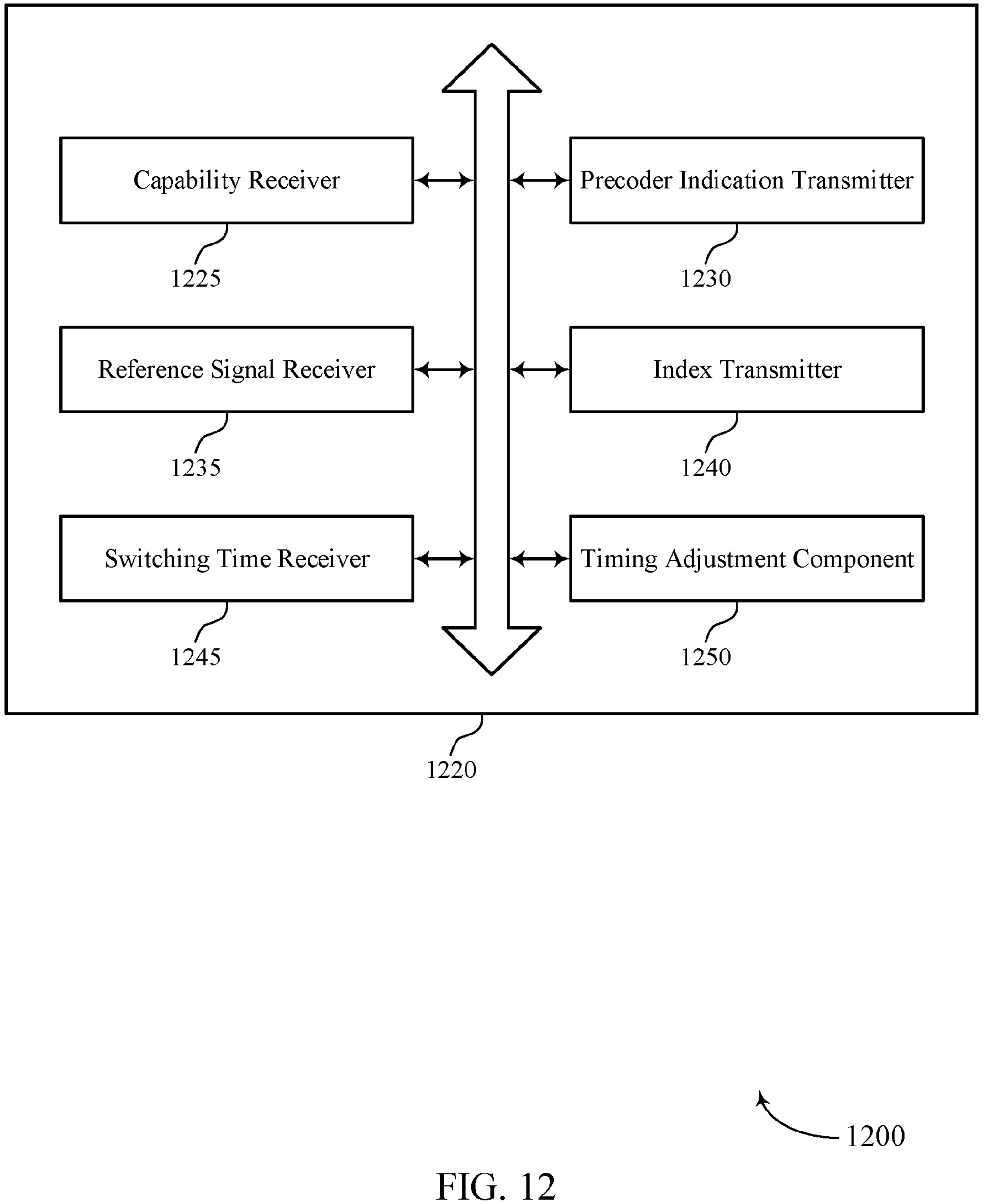
FIG. 12 shows a block diagram of a communications manager that supports codebook-based beamforming considerations for reconfigurable surfaces in accordance with aspects of the present disclosure.

FIG. 12 shows a block diagram 1200 of a communications manager 1220 that supports codebook-based beamforming considerations for RIS surfaces in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of codebook-based beamforming considerations for RIS surfaces as described herein. For example, the communications manager 1220 may include a capability receiver 1225, a precoder indication transmitter 1230, a reference signal receiver 1235, an index transmitter 1240, a switching time receiver 1245, a timing adjustment component 1250, or any combination thereof. Each of these components may communicate, directly or indirectly, with one another (e.g., via one or more buses).

The communications manager 1220 may support wireless communication in accordance with examples as disclosed herein. The capability receiver 1225 may be configured as or otherwise support a means for receiving, from a first wireless device, an indication of a capability of using one or more types of precoders associated with generating a codebook for a reconfigurable surface for redirecting wireless signals. The precoder indication transmitter 1230 may be configured as or otherwise support a means for transmitting, to the first wireless device, an indication of a type of precoder based on receiving the capability. The reference signal receiver 1235 may be configured as or otherwise support a means for receiving one or more reference signals associated with a communication link training process with a second wireless device via the reconfigurable surface. The index transmitter 1240 may be configured as or otherwise support a means for transmitting, to the second wireless device, an index associated with a reference signal of the one or more reference signals, where the index is transmitted based on the reference signal satisfying a measurement criteria.

In some examples, the indication of the capability of using one or more types of precoders includes an indication of a capability of supporting more than one codebook vector, each codebook vector corresponding to a respective portion of a set of multiple elements of the reconfigurable surface. In some examples, the indication of the type of precoder includes an indication of which codebook vector should be used for each portion of the set of multiple elements of the reconfigurable surface.

In some examples, the capability receiver 1225 may be configured as or otherwise support a means for receiving, from the first wireless device, an indication of a capability of the reconfigurable surface for using polarization when redirecting the wireless signals, where the codebook, one or more communication beams, or both, may be based on a polarization.

In some examples, the switching time receiver 1245 may be configured as or otherwise support a means for receiving, from the first wireless device, an indication of a time associated with the first wireless device switching between codewords of the codebook.

In some examples, the timing adjustment component 1250 may be configured as or otherwise support a means for adjusting a timing between one or more signals associated with the communication link training process with the second wireless device based on the time associated with the first wireless device switching between codewords of the codebook.

In some examples, the communication link training process includes downlink control information messages, sidelink control information messages, or a combination thereof.

In some examples, the types of precoders include Legendre polynomial based precoders, DFT precoders, FrFFT precoders, Walsh precoders, Hadamard precoders, Slepian sequence precoders, or a combination thereof.

In some examples, the first wireless device is a controller for the reconfigurable surface and the second wireless device is a UE, a sidelink device, or a combination thereof.

Figure 13:
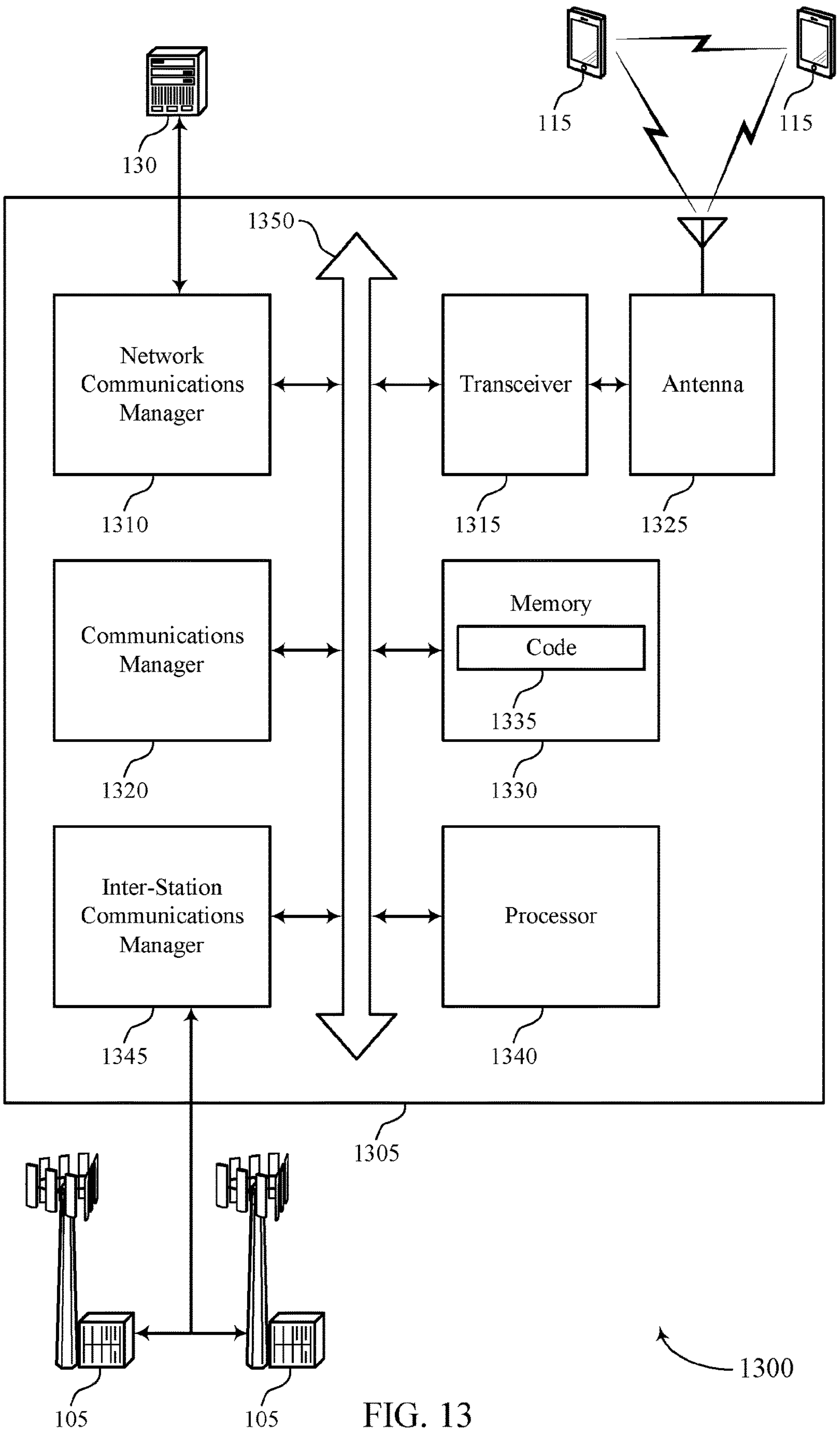
FIG. 13 shows a diagram of a system including a device that supports codebook-based beamforming considerations for reconfigurable surfaces in accordance with aspects of the present disclosure.

FIG. 13 shows a diagram of a system 1300 including a device 1305 that supports codebook-based beamforming considerations for RIS surfaces in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting codebook-based beamforming considerations for RIS surfaces). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication in accordance with examples as disclosed herein. For example, the communications manager 1320 may be configured as or otherwise support a means for receiving, from a first wireless device, an indication of a capability of using one or more types of precoders associated with generating a codebook for a reconfigurable surface for redirecting wireless signals. The communications manager 1320 may be configured as or otherwise support a means for transmitting, to the first wireless device, an indication of a type of precoder based on receiving the capability. The communications manager 1320 may be configured as or otherwise support a means for receiving one or more reference signals associated with a communication link training process with a second wireless device via the reconfigurable surface. The communications manager 1320 may be configured as or otherwise support a means for transmitting, to the second wireless device, an index associated with a reference signal of the one or more reference signals, where the index is transmitted based on the reference signal satisfying a measurement criteria.

By including or configuring the communications manager 1320 in accordance with examples as described herein, the device 1305 may support techniques for codebook generation at an RIS, for example, supporting precoder capability signaling, polarization capability signaling, and switching time signaling resulting in more efficient utilization of communication resources, improved coordination between devices, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of codebook-based beamforming considerations for RIS surfaces as described herein, or the processor 1340 and the memory 1330 may be otherwise configured to perform or support such operations.

Figure 14:
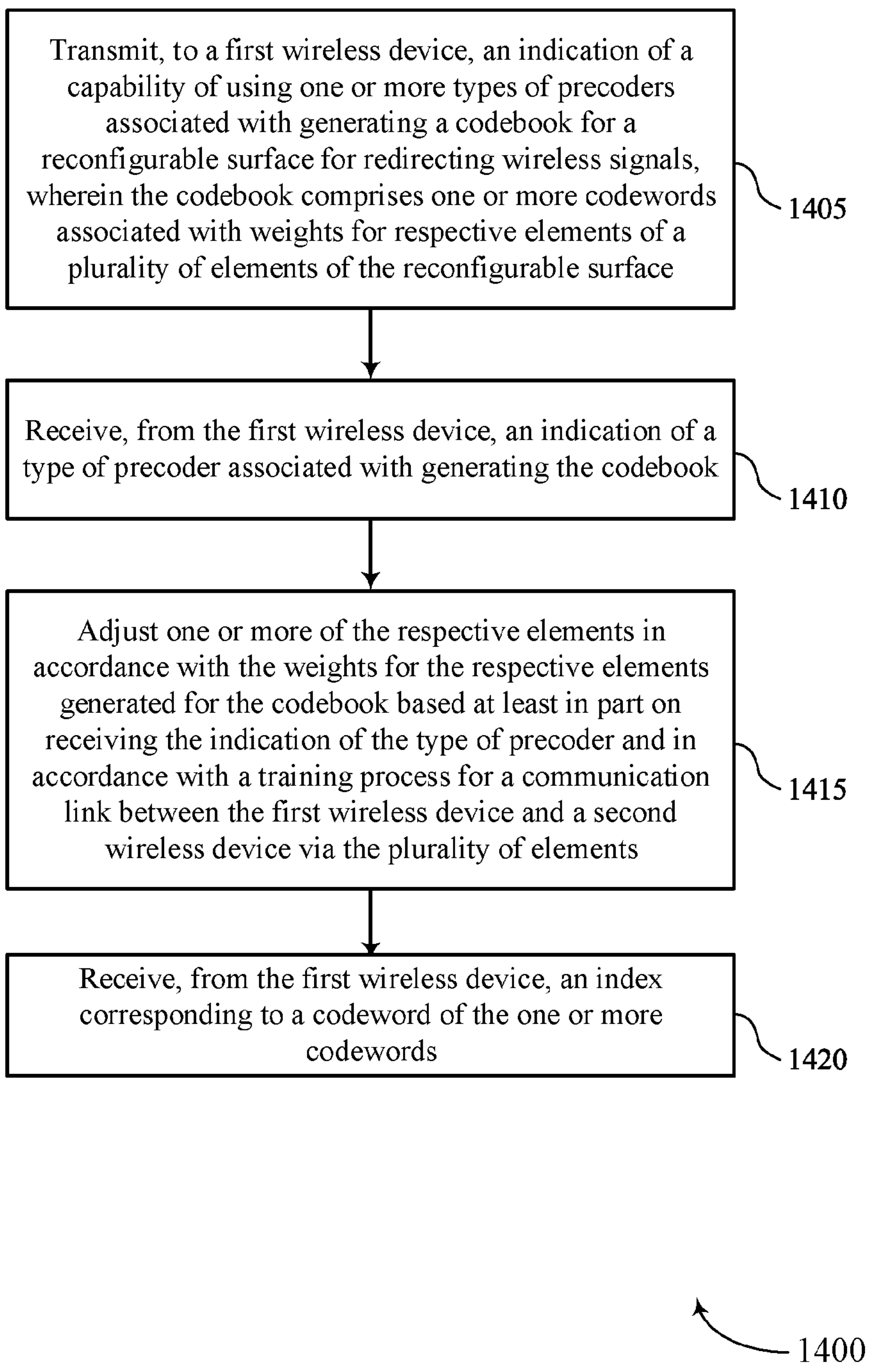
FIGS. 14 through 19 show flowcharts illustrating methods that support codebook-based beamforming considerations for reconfigurable surfaces in accordance with aspects of the present disclosure.

FIG. 14 shows a flowchart illustrating a method 1400 that supports codebook-based beamforming considerations for RIS surfaces in accordance with aspects of the present disclosure. The operations of the method 1400 may be implemented by a wireless device or its components as described herein. For example, the operations of the method 1400 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1405, the method may include transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The operations of 1405 may be performed in accordance with examples as disclosed herein. In some examples, aspects of the operations of 1405 may be performed by a capability transmitter 825 as described with reference to FIG. 8.

At 1410, the method may include receiving, from the first wireless device, an indication of a type of precoder associated with generating the codebook. The operations of 1410 may be performed in accordance with examples as disclosed herein. In some examples, aspects of the operations of 1410 may be performed by a precoder indication receiver 830 as described with reference to FIG. 8.

At 1415, the method may include adjusting one or more of the respective elements in accordance with the weights for the respective elements generated for the codebook based on receiving the indication of the type of precoder and in accordance with a training process for a communication link between the first wireless device and a second wireless device via the set of multiple elements. The operations of 1415 may be performed in accordance with examples as disclosed herein. In some examples, aspects of the operations of 1415 may be performed by a reflective element adjuster 835 as described with reference to FIG. 8.

At 1420, the method may include receiving, from the first wireless device, an index corresponding to a codeword of the one or more codewords. The operations of 1420 may be performed in accordance with examples as disclosed herein. In some examples, aspects of the operations of 1420 may be performed by an index receiver 840 as described with reference to FIG. 8.

Figure 15:
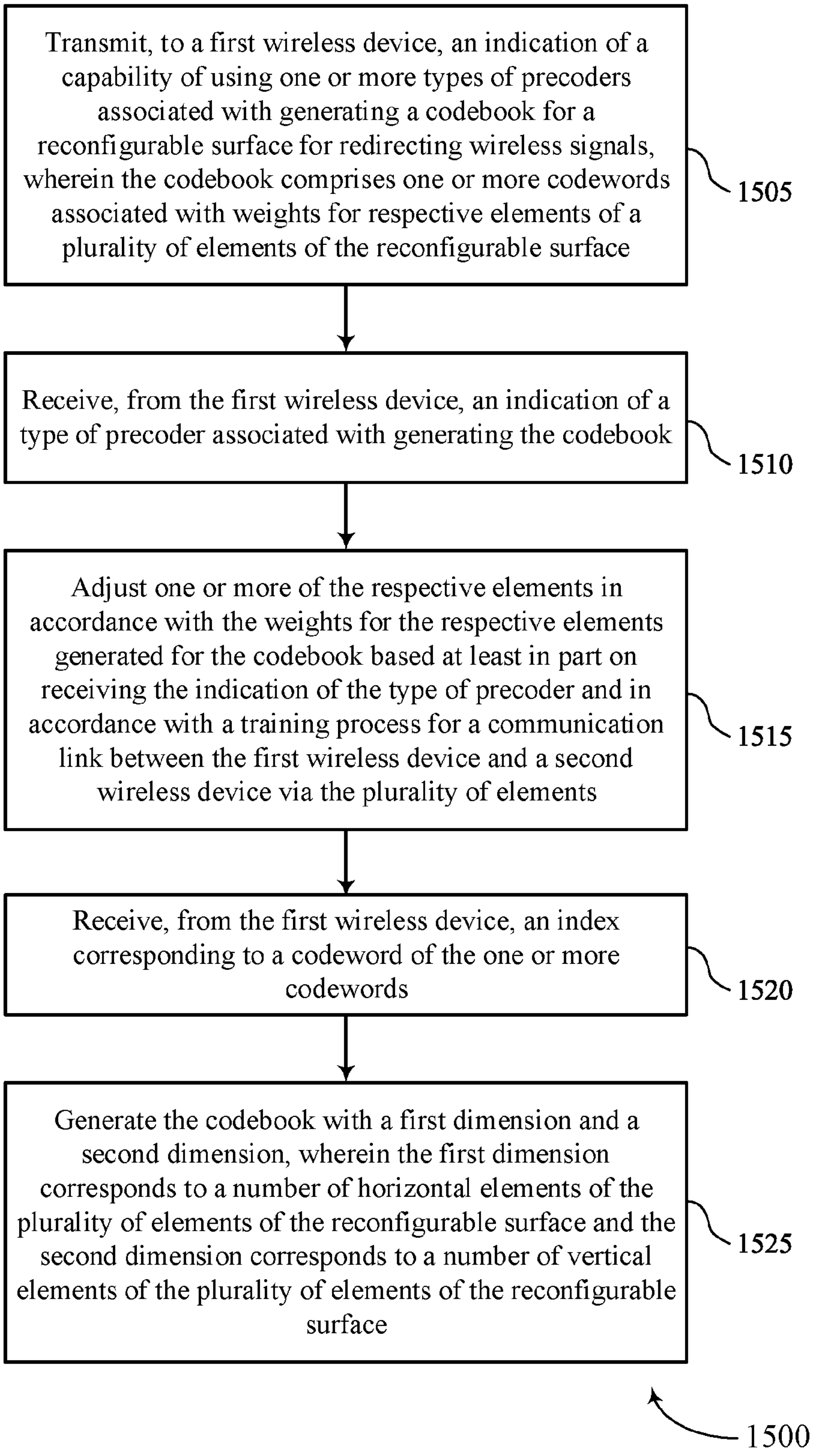

FIG. 15 shows a flowchart illustrating a method 1500 that supports codebook-based beamforming considerations for RIS surfaces in accordance with aspects of the present disclosure. The operations of the method 1500 may be implemented by a wireless device or its components as described herein. For example, the operations of the method 1500 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1505, the method may include transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The operations of 1505 may be performed in accordance with examples as disclosed herein. In some examples, aspects of the operations of 1505 may be performed by a capability transmitter 825 as described with reference to FIG. 8.

At 1510, the method may include receiving, from the first wireless device, an indication of a type of precoder associated with generating the codebook. The operations of 1510 may be performed in accordance with examples as disclosed herein. In some examples, aspects of the operations of 1510 may be performed by a precoder indication receiver 830 as described with reference to FIG. 8.

At 1515, the method may include adjusting one or more of the respective elements in accordance with the weights for the respective elements generated for the codebook based on receiving the indication of the type of precoder and in accordance with a training process for a communication link between the first wireless device and a second wireless device via the set of multiple elements. The operations of 1515 may be performed in accordance with examples as disclosed herein. In some examples, aspects of the operations of 1515 may be performed by a reflective element adjuster 835 as described with reference to FIG. 8.

At 1520, the method may include receiving, from the first wireless device, an index corresponding to a codeword of the one or more codewords. The operations of 1520 may be performed in accordance with examples as disclosed herein. In some examples, aspects of the operations of 1520 may be performed by an index receiver 840 as described with reference to FIG. 8.

At 1525, the method may include generating the codebook with a first dimension and a second dimension, where the first dimension corresponds to a number of horizontal elements of the set of multiple elements of the reconfigurable surface and the second dimension corresponds to a number of vertical elements of the set of multiple elements of the reconfigurable surface. The operations of 1525 may be performed in accordance with examples as disclosed herein. In some examples, aspects of the operations of 1525 may be performed by a codebook generation component 845 as described with reference to FIG. 8.

Figure 16:
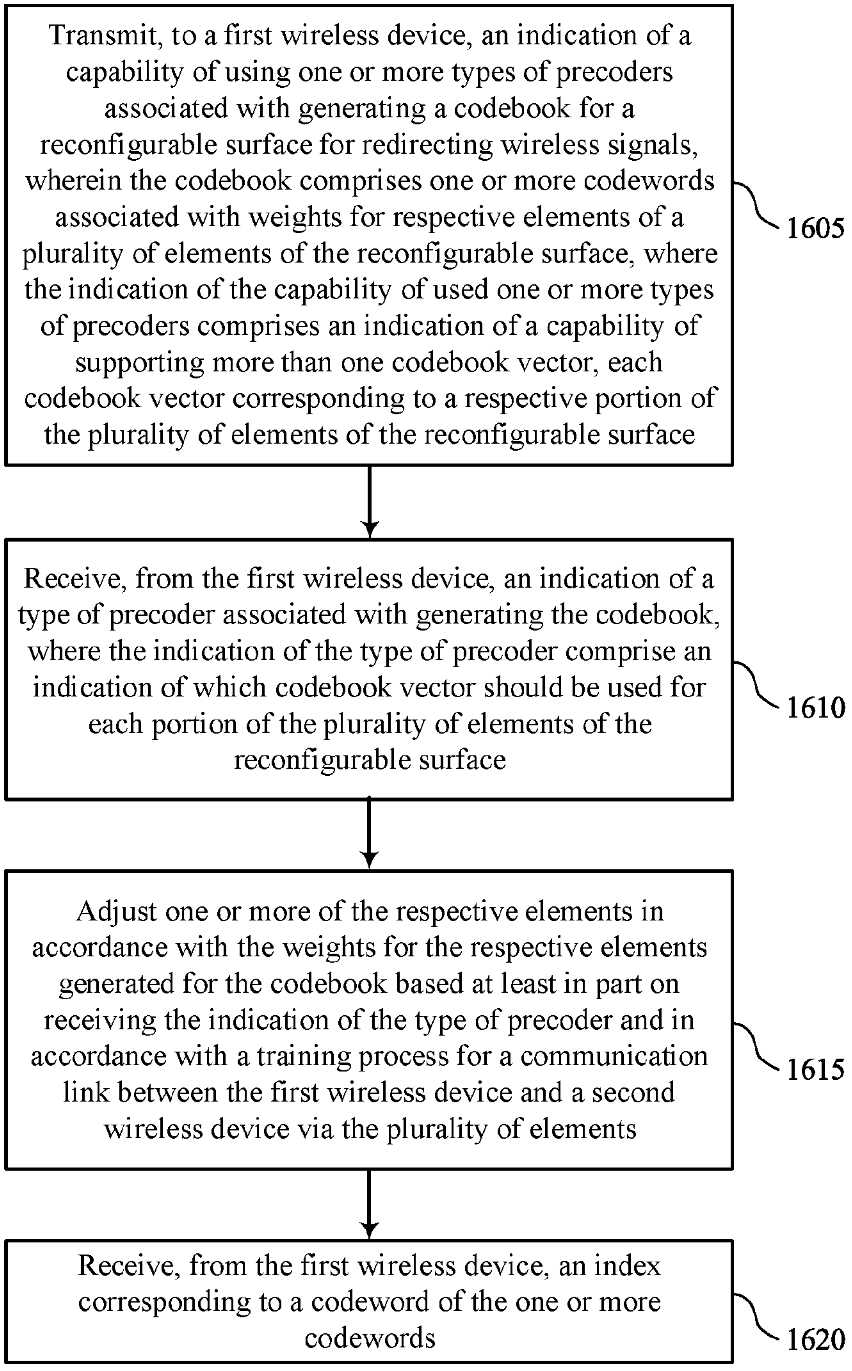

FIG. 16 shows a flowchart illustrating a method 1600 that supports codebook-based beamforming considerations for RIS surfaces in accordance with aspects of the present disclosure. The operations of the method 1600 may be implemented by a wireless device or its components as described herein. For example, the operations of the method 1600 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1605, the method may include transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The operations of 1605 may be performed in accordance with examples as disclosed herein. In some examples, aspects of the operations of 1605 may be performed by a capability transmitter 825 as described with reference to FIG. 8. In some examples, the indication of the capability of using one or more types of precoders includes an indication of a capability of supporting more than one codebook vector, each codebook vector corresponding to a respective portion of the set of multiple elements of the reconfigurable surface.

At 1610, the method may include receiving, from the first wireless device, an indication of a type of precoder associated with generating the codebook. The operations of 1610 may be performed in accordance with examples as disclosed herein. In some examples, aspects of the operations of 1615 may be performed by a precoder indication receiver 830 as described with reference to FIG. 8. In some examples, the indication of the type of precoder including an indication of which codebook vector should be used for each portion of the set of multiple elements of the reconfigurable surface.

At 1615, the method may include adjusting one or more of the respective elements in accordance with the weights for the respective elements generated for the codebook based on receiving the indication of the type of precoder and in accordance with a training process for a communication link between the first wireless device and a second wireless device via the set of multiple elements. The operations of 1615 may be performed in accordance with examples as disclosed herein. In some examples, aspects of the operations of 1615 may be performed by a reflective element adjuster 835 as described with reference to FIG. 8.

At 1620, the method may include receiving, from the first wireless device, an index corresponding to a codeword of the one or more codewords. The operations of 1620 may be performed in accordance with examples as disclosed herein. In some examples, aspects of the operations of 1620 may be performed by an index receiver 840 as described with reference to FIG. 8.

Figure 17:
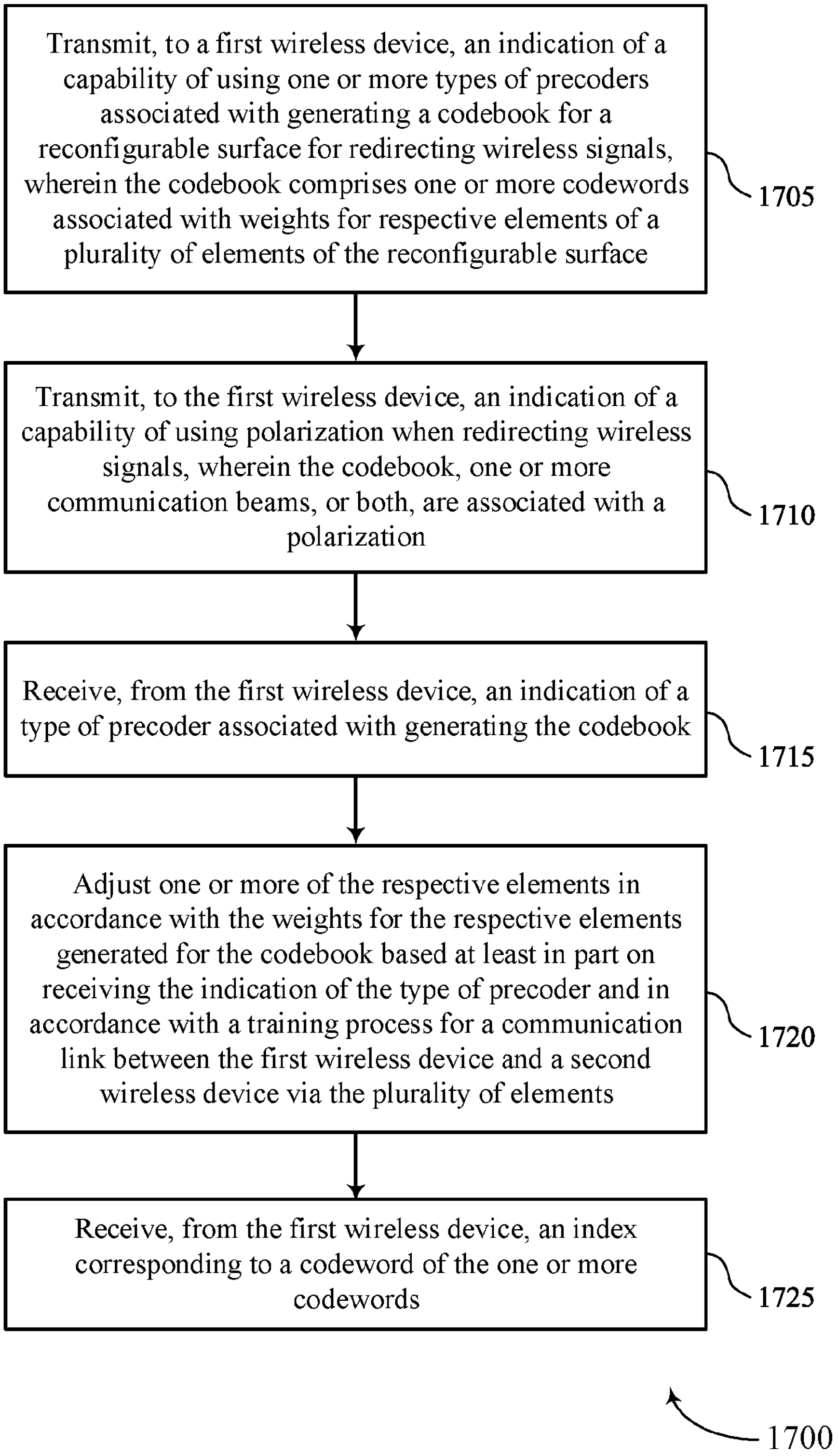

FIG. 17 shows a flowchart illustrating a method 1700 that supports codebook-based beamforming considerations for RIS surfaces in accordance with aspects of the present disclosure. The operations of the method 1700 may be implemented by a wireless device or its components as described herein. For example, the operations of the method 1700 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1705, the method may include transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The operations of 1705 may be performed in accordance with examples as disclosed herein. In some examples, aspects of the operations of 1705 may be performed by a capability transmitter 825 as described with reference to FIG. 8.

At 1710, the method may include transmitting, to the first wireless device, an indication of a capability of using polarization when redirecting wireless signals, where the codebook, one or more communication beams, or both, are associated with a polarization. The operations of 1710 may be performed in accordance with examples as disclosed herein. In some examples, aspects of the operations of 1710 may be performed by a capability transmitter 825 as described with reference to FIG. 8.

At 1715, the method may include receiving, from the first wireless device, an indication of a type of precoder associated with generating the codebook. The operations of 1715 may be performed in accordance with examples as disclosed herein. In some examples, aspects of the operations of 1715 may be performed by a precoder indication receiver 830 as described with reference to FIG. 8.

At 1720, the method may include adjusting one or more of the respective elements in accordance with the weights for the respective elements generated for the codebook based on receiving the indication of the type of precoder and in accordance with a training process for a communication link between the first wireless device and a second wireless device via the set of multiple elements. The operations of 1720 may be performed in accordance with examples as disclosed herein. In some examples, aspects of the operations of 1720 may be performed by a reflective element adjuster 835 as described with reference to FIG. 8.

At 1725, the method may include receiving, from the first wireless device, an index corresponding to a codeword of the one or more codewords. The operations of 1725 may be performed in accordance with examples as disclosed herein. In some examples, aspects of the operations of 1725 may be performed by an index receiver 840 as described with reference to FIG. 8.

Figure 18:
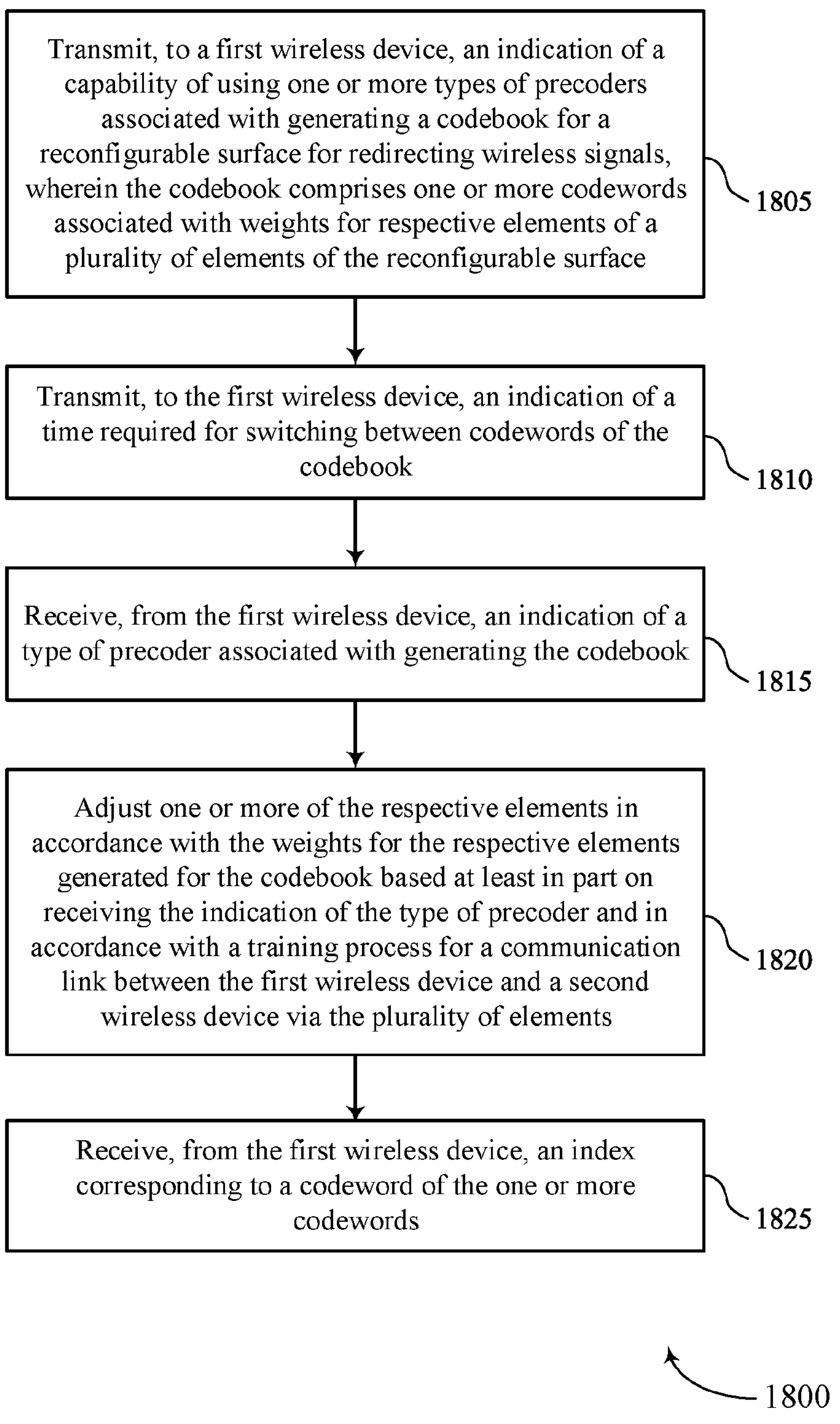

FIG. 18 shows a flowchart illustrating a method 1800 that supports codebook-based beamforming considerations for RIS surfaces in accordance with aspects of the present disclosure. The operations of the method 1800 may be implemented by a wireless device or its components as described herein. For example, the operations of the method 1800 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1805, the method may include transmitting, to a first wireless device, an indication of a capability of using one or more types of precoders associated with generating a codebook for a reconfigurable surface for redirecting wireless signals, where the codebook includes one or more codewords associated with weights for respective elements of a set of multiple elements of the reconfigurable surface. The operations of 1805 may be performed in accordance with examples as disclosed herein. In some examples, aspects of the operations of 1805 may be performed by a capability transmitter 825 as described with reference to FIG. 8.

At 1810, the method may include transmitting, to the first wireless device, an indication of a time required for switching between codewords of the codebook. The operations of 1810 may be performed in accordance with examples as disclosed herein. In some examples, aspects of the operations of 1810 may be performed by a switching time transmitter 850 as described with reference to FIG. 8.

At 1815, the method may include receiving, from the first wireless device, an indication of a type of precoder associated with generating the codebook. The operations of 1815 may be performed in accordance with examples as disclosed herein. In some examples, aspects of the operations of 1815 may be performed by a precoder indication receiver 830 as described with reference to FIG. 8.

At 1820, the method may include adjusting one or more of the respective elements in accordance with the weights for the respective elements generated for the codebook based on receiving the indication of the type of precoder and in accordance with a training process for a communication link between the first wireless device and a second wireless device via the set of multiple elements. The operations of 1820 may be performed in accordance with examples as disclosed herein. In some examples, aspects of the operations of 1820 may be performed by a reflective element adjuster 835 as described with reference to FIG. 8.

At 1825, the method may include receiving, from the first wireless device, an index corresponding to a codeword of the one or more codewords. The operations of 1825 may be performed in accordance with examples as disclosed herein. In some examples, aspects of the operations of 1825 may be performed by an index receiver 840 as described with reference to FIG. 8.

Figure 19:
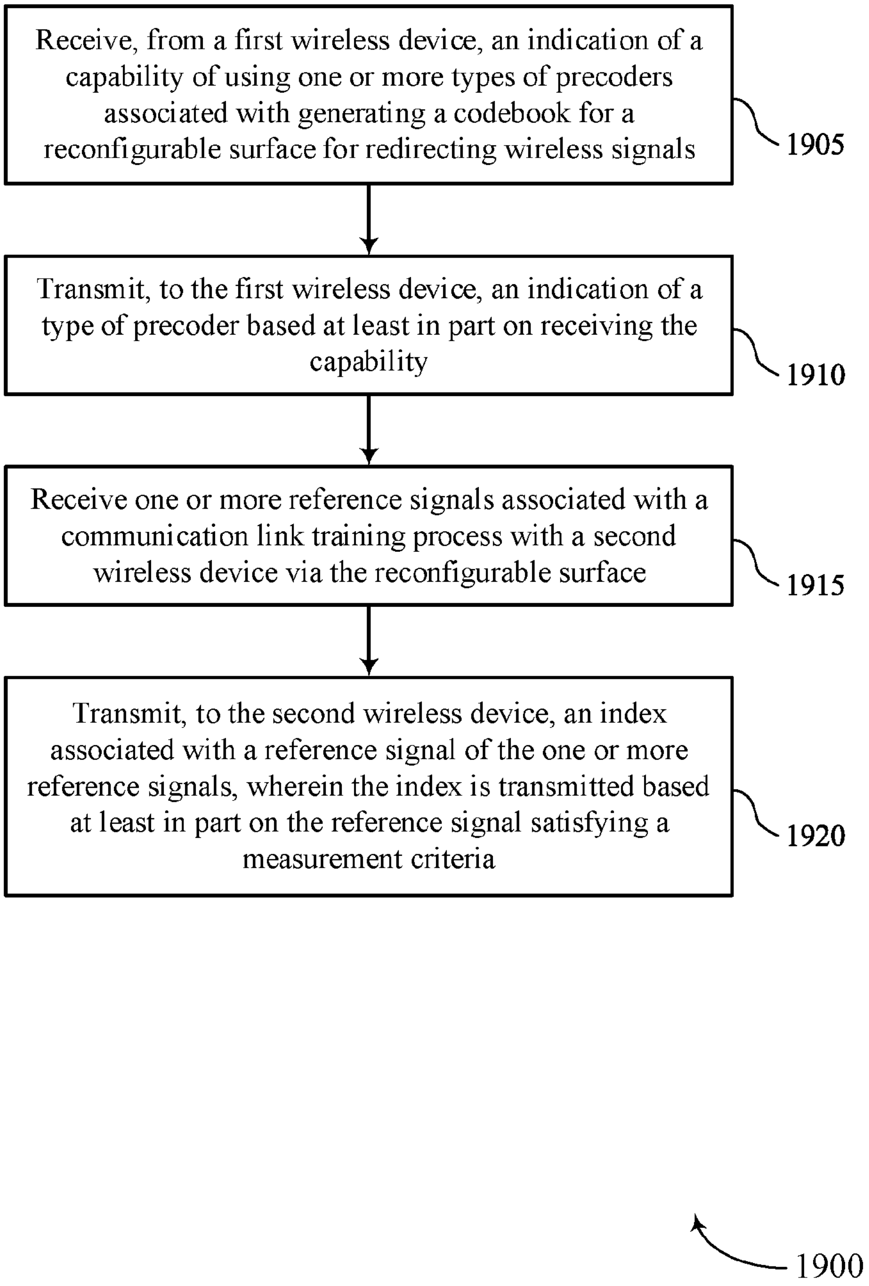

FIG. 19 shows a flowchart illustrating a method 1900 that supports codebook-based beamforming considerations for RIS surfaces in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include receiving, from a first wireless device, an indication of a capability of using one or more types of precoders associated with generating a codebook for a reconfigurable surface for redirecting wireless signals. The operations of 1905 may be performed in accordance with examples as disclosed herein. In some examples, aspects of the operations of 1905 may be performed by a capability receiver 1225 as described with reference to FIG. 12.

At 1910, the method may include transmitting, to the first wireless device, an indication of a type of precoder based on receiving the capability. The operations of 1910 may be performed in accordance with examples as disclosed herein. In some examples, aspects of the operations of 1910 may be performed by a precoder indication transmitter 1230 as described with reference to FIG. 12.

At 1915, the method may include receiving one or more reference signals associated with a communication link training process with a second wireless device via the reconfigurable surface. The operations of 1915 may be performed in accordance with examples as disclosed herein. In some examples, aspects of the operations of 1915 may be performed by a reference signal receiver 1235 as described with reference to FIG. 12.

At 1920, the method may include transmitting, to the second wireless device, an index associated with a reference signal of the one or more reference signals, where the index is transmitted based on the reference signal satisfying a measurement criteria. The operations of 1920 may be performed in accordance with examples as disclosed herein. In some examples, aspects of the operations of 1920 may be performed by an index transmitter 1240 as described with reference to FIG. 12.

The following provides an overview of aspects of the present disclosure:

Aspect 1: A method for wireless communication, comprising: transmitting, to a first wireless device, an indication of a capability of using one or more types of precoders associated with generating a codebook for a reconfigurable surface for redirecting wireless signals, wherein the codebook comprises one or more codewords associated with weights for respective elements of a plurality of elements of the reconfigurable surface; receiving, from the first wireless device, an indication of a type of precoder associated with generating the codebook; adjusting one or more of the respective elements in accordance with the weights for the respective elements generated for the codebook based at least in part on receiving the indication of the type of precoder and in accordance with a training process for a communication link between the first wireless device and a second wireless device via the plurality of elements; and receiving, from the first wireless device, an index corresponding to a codeword of the one or more codewords.

Aspect 2: The method of aspect 1, further comprising: generating the codebook with a first dimension and a second dimension, wherein the first dimension corresponds to a number of horizontal elements of the plurality of elements of the reconfigurable surface and the second dimension corresponds to a number of vertical elements of the plurality of elements of the reconfigurable surface.

Aspect 3: The method of any of aspects 1 through 2, wherein the indication of the capability of using one or more types of precoders comprises an indication of a capability of supporting more than one codebook vector, each codebook vector corresponding to a respective portion of the plurality of elements of the reconfigurable surface; and the indication of the type of precoder comprises an indication of which codebook vector should be used for each portion of the plurality of elements of the reconfigurable surface.

Aspect 4: The method of aspect 3, further comprising: generating the codebook including multiple codebook vectors, wherein generating the codebook for each of the multiple codebook vectors is based at least in part on receiving the indication.

Aspect 5: The method of any of aspects 1 through 4, further comprising: transmitting, to the first wireless device, an indication of a capability of using polarization when redirecting wireless signals, wherein the codebook, one or more communication beams, or both, are associated with a polarization.

Aspect 6: The method of any of aspects 1 through 5, further comprising: transmitting, to the first wireless device, an indication of a time required for switching between codewords of the codebook.

Aspect 7: The method of any of aspects 1 through 6, wherein the types of precoders include Legendre polynomial based precoders, discrete fourier transform precoders, fractional fast fourier transform precoders, walsh precoders, hadamard precoders, slepian sequence precoders, or a combination thereof.

Aspect 8: The method of any of aspects 1 through 7, wherein the first wireless device is a base station and the second wireless device is a UE.

Aspect 9: The method of any of aspects 1 through 8, wherein the first wireless device is a first sidelink device and the second wireless device is a second sidelink device.

Aspect 10: A method for wireless communication, comprising: receiving, from a first wireless device, an indication of a capability of using one or more types of precoders associated with generating a codebook for a reconfigurable surface for redirecting wireless signals; transmitting, to the first wireless device, an indication of a type of precoder based at least in part on receiving the capability; receiving one or more reference signals associated with a communication link training process with a second wireless device via the reconfigurable surface; and transmitting, to the second wireless device, an index associated with a reference signal of the one or more reference signals, wherein the index is transmitted based at least in part on the reference signal satisfying a measurement criteria.

Aspect 11: The method of aspect 10, wherein the indication of the capability of using one or more types of precoders comprises an indication of a capability of supporting more than one codebook vector, each codebook vector corresponding to a respective portion of a plurality of elements of the reconfigurable surface; and the indication of the type of precoder comprises an indication of which codebook vector should be used for each portion of the plurality of elements of the reconfigurable surface.

Aspect 12: The method of any of aspects 10 through 11, further comprising: receiving, from the first wireless device, an indication of a capability of the reconfigurable surface for using polarization when redirecting the wireless signals, wherein the codebook, one or more communication beams, or both, may be based on a polarization.

Aspect 13: The method of any of aspects 10 through 12, further comprising: receiving, from the first wireless device, an indication of a time associated with the first wireless device switching between codewords of the codebook.

Aspect 14: The method of aspect 13, further comprising: adjusting a timing between one or more signals associated with the communication link training process with the second wireless device based on the time associated with the first wireless device switching between codewords of the codebook.

Aspect 15: The method of aspect 14, wherein the communication link training process includes downlink control information messages, sidelink control information messages, or a combination thereof.

Aspect 16: The method of any of aspects 10 through 15, wherein the types of precoders include Legendre polynomial based precoders, discrete fourier transform precoders, fractional fast fourier transform precoders, walsh precoders, hadamard precoders, slepian sequence precoders, or a combination thereof.

Aspect 17: The method of any of aspects 10 through 16, wherein the first wireless device is a controller for the reconfigurable surface and the second wireless device is a UE, a sidelink device, or a combination thereof.

Aspect 18: An apparatus for wireless communication, comprising a processor; memory coupled with the processor; and instructions stored in the memory and executable by the processor to cause the apparatus to perform a method of any of aspects 1 through 9.

Aspect 19: An apparatus for wireless communication, comprising at least one means for performing a method of any of aspects 1 through 9.

Aspect 20: A non-transitory computer-readable medium storing code for wireless communication, the code comprising instructions executable by a processor to perform a method of any of aspects 1 through 9.

Aspect 21: An apparatus for wireless communication, comprising a processor; memory coupled with the processor; and instructions stored in the memory and executable by the processor to cause the apparatus to perform a method of any of aspects 10 through 17.

Aspect 22: An apparatus for wireless communication, comprising at least one means for performing a method of any of aspects 10 through 17.

Aspect 23: A non-transitory computer-readable medium storing code for wireless communication, the code comprising instructions executable by a processor to perform a method of any of aspects 10 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, the method comprising:

transmitting, to a first wireless device, an indication of a capability of utilizing one or more types of precoders associated with generating a codebook for a reconfigurable surface for redirecting wireless signals, wherein the codebook comprises one or more codewords associated with weights for respective elements of a plurality of elements of the reconfigurable surface;

receiving, from the first wireless device, an indication of a type of precoder associated with generating the codebook;

adjusting one or more of the respective elements in accordance with the weights for the respective elements generated for the codebook based at least in part on receiving the indication of the type of precoder and in accordance with a training process for a communication link between the first wireless device and a second wireless device via the plurality of elements; and receiving, from the first wireless device, an index corresponding to a codeword of the one or more codewords.

2. The method of claim 1, further comprising:

generating the codebook with a first dimension and a second dimension, wherein the first dimension corresponds to a number of horizontal elements of the plurality of elements of the reconfigurable surface and the second dimension corresponds to a number of vertical elements of the plurality of elements of the reconfigurable surface.

3. The method of claim 1, wherein:

the indication of the capability of utilizing one or more types of precoders comprises an indication of a capability of supporting more than one codebook vector, each codebook vector corresponding to a respective portion of the plurality of elements of the reconfigurable surface; and the indication of the type of precoder comprises an indication of which codebook vector is utilized for each portion of the plurality of elements of the reconfigurable surface.

4. The method of claim 3, further comprising:

generating the codebook including multiple codebook vectors, wherein generating the codebook for each of the multiple codebook vectors is based at least in part on receiving the indication of the type of precoder.

5. The method of claim 1, further comprising:

transmitting, to the first wireless device, a second indication of a capability of utilizing polarization when redirecting wireless signals, wherein the codebook and one or more communication beams are associated with a polarization.

6. The method of claim 1, further comprising:

transmitting, to the first wireless device, an indication of a time required for switching between the one or more codewords of the codebook.

7. The method of claim 1, wherein the one or more types of precoders include Legendre polynomial based precoders, discrete Fourier transform precoders, fractional fast Fourier transform precoders, Walsh precoders, Hadamard precoders, Slepian sequence precoders, or a combination thereof.

8. The method of claim 1, wherein the first wireless device is a base station and the second wireless device is a user equipment (UE).

9. The method of claim 1, wherein the first wireless device is a first sidelink device and the second wireless device is a second sidelink device.

10. An apparatus for wireless communication, the apparatus comprising:

one or more processors;

one or more memories coupled with the one or more processors; and instructions stored in the one or more memories and executable by the one or more processors to cause the apparatus to:

transmit, to a first wireless device, an indication of a capability of utilizing one or more types of precoders associated with generating a codebook for a reconfigurable surface for redirecting wireless signals, wherein the codebook comprises one or more codewords associated with weights for respective elements of a plurality of elements of the reconfigurable surface;

receive, from the first wireless device, an indication of a type of precoder associated with generating the codebook;

adjust one or more of the respective elements in accordance with the weights for the respective elements generated for the codebook based at least in part on receiving the indication of the type of precoder and in accordance with a training process for a communication link between the first wireless device and a second wireless device via the plurality of elements; and receive, from the first wireless device, an index corresponding to a codeword of the one or more codewords.

11. The apparatus of claim 10, wherein the instructions are further executable by the one or more processors to cause the apparatus to:

generate the codebook with a first dimension and a second dimension, wherein the first dimension corresponds to a number of horizontal elements of the plurality of elements of the reconfigurable surface and the second dimension corresponds to a number of vertical elements of the plurality of elements of the reconfigurable surface.

12. The apparatus of claim 10, wherein:

the indication of the capability of utilizing one or more types of precoders comprises an indication of a capability of supporting more than one codebook vector, each codebook vector corresponding to a respective portion of the plurality of elements of the reconfigurable surface; and the indication of the type of precoder comprises an indication of which codebook vector is utilized for each portion of the plurality of elements of the reconfigurable surface.

13. The apparatus of claim 12, wherein the instructions are further executable by the one or more processors to cause the apparatus to:

generate the codebook including multiple codebook vectors, wherein generating the codebook for each of the multiple codebook vectors is based at least in part on receiving the indication of the type of precoder.

14. The apparatus of claim 10, wherein the instructions are further executable by the one or more processors to cause the apparatus to:

transmit, to the first wireless device, a second indication of a capability of utilizing polarization when redirecting wireless signals, wherein the codebook and one or more communication beams are associated with a polarization.

15. The apparatus of claim 10, wherein the instructions are further executable by the one or more processors to cause the apparatus to:

transmit, to the first wireless device, an indication of a time required for switching between the one or more codewords of the codebook.

16. The apparatus of claim 10, wherein the one or more types of precoders include Legendre polynomial based precoders, discrete Fourier transform precoders, fractional fast Fourier transform precoders, Walsh precoders, Hadamard precoders, Slepian sequence precoders, or a combination thereof.

17. The apparatus of claim 10, wherein the first wireless device is a base station and the second wireless device is a user equipment (UE).

18. The apparatus of claim 10, wherein the first wireless device is a first sidelink device and the second wireless device is a second sidelink device.

* * * * *